United States Patent
Hatta et al.

(10) Patent No.: US 12,044,185 B2
(45) Date of Patent: Jul. 23, 2024

(54) GAS TURBINE CONTROL METHOD, STORAGE MEDIUM STORING GAS TURBINE CONTROL PROGRAM, GAS TURBINE CONTROL DEVICE, AND GAS TURBINE FACILITY

(71) Applicant: MITSUBISHI HEAVY INDUSTRIES, LTD., Tokyo (JP)

(72) Inventors: Masayoshi Hatta, Tokyo (JP); Kazuki Morimoto, Tokyo (JP); Susumu Wakazono, Tokyo (JP); Tomohiko Yamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/206,851

(22) Filed: Jun. 7, 2023

(65) Prior Publication Data
US 2023/0399987 A1   Dec. 14, 2023

(30) Foreign Application Priority Data
Jun. 10, 2022   (JP) .................. 2022-094254

(51) Int. Cl.
*F02C 9/52*   (2006.01)
*F02C 9/28*   (2006.01)
*F02C 9/54*   (2006.01)

(52) U.S. Cl.
CPC .............. *F02C 9/52* (2013.01); *F02C 9/28* (2013.01); *F02C 9/54* (2013.01); *F05D 2260/606* (2013.01); *F05D 2270/05* (2013.01)

(58) Field of Classification Search
CPC ................. F02C 9/28; F02C 9/52; F02C 9/54
See application file for complete search history.

(56) References Cited

U.S. PATENT DOCUMENTS

| 8,015,826 B2 | 9/2011 | Myers et al. | |
| 2014/0000270 A1* | 1/2014 | Dobbeling | F02C 9/28 60/726 |
| 2014/0257666 A1* | 9/2014 | Abrol | F02C 9/48 701/100 |
| 2015/0075170 A1* | 3/2015 | Scipio | F02C 9/263 60/803 |
| 2015/0081121 A1* | 3/2015 | Morgan | F02C 9/00 700/287 |
| 2016/0138481 A1* | 5/2016 | Davis, Jr. | F02C 9/28 701/100 |
| 2016/0153365 A1* | 6/2016 | Fletcher | F23R 3/26 60/773 |
| 2016/0222820 A1* | 8/2016 | Truesdale | F01D 25/002 |

* cited by examiner

*Primary Examiner* — William H Rodriguez
(74) *Attorney, Agent, or Firm* — Wenderoth, Lind & Ponack, L.L.P.

(57) ABSTRACT

A control device includes a suction amount controller and a bleed flow controller. When an actual output is in a second output range from a second output to a third output less than the second output, the suction amount controller controls a suction amount so that the suction amount becomes constant even if the actual output decreases. The bleed flow controller controls a bleed flow so that the bleed flow gradually increases as the actual output decreases.

16 Claims, 9 Drawing Sheets

GAS TURBINE CONTROL METHOD, STORAGE MEDIUM STORING GAS TURBINE CONTROL PROGRAM, GAS TURBINE CONTROL DEVICE, AND GAS TURBINE FACILITY

CROSS-REFERENCE TO RELATED APPLICATION

Priority is claimed on Japanese Patent Application No. 2022-094254, filed Jun. 10, 2022, the content of which is incorporated herein by reference.

BACKGROUND OF THE INVENTION

Field of the Invention

The present disclosure relates to a gas turbine control method, a storage medium storing a gas turbine control program, a gas turbine control device, and a gas turbine facility.

Description of Related Art

A gas turbine includes a compressor configured to compress air, a combustor configured to burn fuel in the air compressed by the compressor to generate combustion gas, and a turbine driven by the combustion gas G. The compressor includes a compressor rotor, a compressor casing configured to cover the compressor rotor, and a suction amount adjuster (hereinafter referred to as an inlet guide vane (IGV)). This IGV includes a plurality of vanes at a suction port of the compressor casing and a flow rate of air suctioned into the compressor casing is adjusted by causing the plurality of vanes to perform an opening or closing operation. A rotor of a power generator is connected to the compressor rotor.

In the above gas turbine, the flow rate of the fuel supplied to the combustor is reduced compared to when the gas turbine is in a rated operation, and the flow rate of air suctioned by the compressor (hereinafter referred to as a suction amount) is reduced by the IGV, such that the output of the gas turbine can be reduced.

However, in recent years, in order to cope with load fluctuations, it has been necessary to lower the output of the gas turbine while operating the gas turbine stably.

As technology for coping with such requirements, for example, there is technology described in the following Patent Document 1. In this technology, a bypass valve that can externally exhaust a part of the compressed air generated by the compressor is provided in the gas turbine. In this technology, the IGV and the bypass valve are used together to reduce the flow rate of combustion air flowing into the combustor, thereby reducing the output of the gas turbine.

In this technology, specifically, when the output of the gas turbine is lowered, the fuel flow rate is first gradually reduced and the suction amount is gradually reduced by causing the IGV to perform a closing operation. Subsequently, when the suction amount becomes somewhat small, the bypass valve is gradually opened. In the process of gradually opening this bypass valve, the IGV is opened to gradually increase the suction amount. In the process of gradually opening this bypass valve, the fuel flow rate does not change. Also, when the bypass valve is fully opened, the fuel flow rate is gradually reduced again, and the suction amount is gradually reduced again by causing the IGV to perform a closing operation.

In this technology, in the process of gradually opening the bypass valve and externally exhausting the compressed air, because the IGV is operated to gradually increase the suction amount, the flow rate of the combustion air flowing into the combustor does not change in this process. For this reason, although a work amount of the turbine itself does not change, an ineffective work amount by the compressor gradually increases and therefore the output of the gas turbine also decreases in this process.

Patent Documents

[Patent Document 1] U.S. Pat. No. 8,015,826

SUMMARY OF THE INVENTION

In the technology described in Patent Document 1, it is certainly possible to reduce the output of the gas turbine while stably operating the gas turbine.

However, in the technology described in Patent Document 1, because the IGV is allowed to perform a closing operation, subsequently perform an opening operation, and subsequently perform the closing operation again in the process of lowering the output of the gas turbine, as described above, the operation of the IGV becomes complex and durability of the IGV is lowered.

Also, in the process of lowering the gas turbine, it is also desirable to reduce an exhaust amount of an unburned component such as carbon monoxide from the gas turbine as much as possible.

Therefore, an objective of the present disclosure is to provide technology for reducing an output of a gas turbine while stably operating the gas turbine, suppress the decrease in durability of a suction amount adjuster, and reduce an exhaust mount of an unburned component.

A gas turbine control method serving as an aspect for achieving the above-described objective is applied to the following gas turbine.

The gas turbine includes a compressor configured to compress air to generate the compressed air, a combustor configured to burn fuel in the compressed air to generate combustion gas, and a turbine driven by the combustion gas.

The gas turbine control method includes a fuel control step of controlling a fuel flow rate so that the fuel flow rate of the fuel supplied to the combustor becomes a flow rate corresponding to a target output for the gas turbine; a suction amount control step of controlling a suction amount so that the suction amount, which is a flow rate of the air suctioned by the compressor, becomes a flow rate corresponding to an actual output of the gas turbine; and a bleed flow control step of controlling a bleed flow so that the bleed flow, which is a flow rate for externally exhausting a part of the compressed air from the compressor without involving the combustor, becomes a flow rate corresponding to the actual output. The fuel flow rate is controlled so that the fuel flow rate gradually decreases as the target output decreases in the fuel control step. The suction amount control step includes a first suction amount control step and a second suction amount control step. The bleed flow control step includes a first bleed flow control step and a second bleed flow control step. When the actual output is in a first output range from a first output less than or equal to a rated output of the gas turbine to a second output that is an output less than the first output, the suction amount is controlled so that the suction amount gradually decreases as the actual output decreases in the first suction amount control step, and the bleed flow is controlled so that the bleed flow is maintained at 0 in the first bleed flow control step. When the actual output is in a second output range from the second output to a third output that is an output less than the second output, the suction amount is controlled so that the suction amount gradually decreases as the actual output decreases or the suction amount becomes constant even if the actual output decreases in the second suction amount control step, and the bleed flow is controlled so that the bleed flow gradually increases as the actual output decreases and a ratio of the bleed flow to the suction amount becomes maximum when the actual output of the gas turbine becomes the third output in the second bleed flow control step.

In the present aspect, in the process of reducing the output of the gas turbine, the fuel flow rate is gradually reduced, both the suction amount and the bleed flow are controlled, and the flow rate of compressed air flowing into the combustor is gradually reduced and therefore it is possible to decrease the output of the gas turbine while stably operating the gas turbine.

In the present aspect, in the process of reducing the output of the gas turbine, the suction amount is decreased, but the suction amount is not increased. That is, in the present aspect, in the process of reducing the output of the gas turbine, the suction amount adjuster capable of adjusting the suction amount is allowed to perform a closing operation without performing an opening operation. Thus, in the present aspect, a decrease in the durability of the suction amount adjuster can be suppressed.

In the present aspect, because the turbine inlet temperature increases when the actual output is in the range from the second output to the third output, the exhaust amount of an unburned component such as carbon monoxide can be reduced within this range.

A non-transitory computer-readable storage medium storing a control program for a gas turbine as an aspect for achieving the above-described objective is applied to the following gas turbine control.

The gas turbine includes a compressor configured to compress air to generate the compressed air, a combustor configured to burn fuel in the compressed air to generate combustion gas, a turbine driven by the combustion gas, a fuel line connected to the combustor so that the fuel is able to be supplied to the combustor, a fuel valve provided on the fuel line and configured to adjust a fuel flow rate that is a flow rate of the fuel flowing through the fuel line, a bypass line configured to externally exhaust a part of the compressed air from the compressor without involving the combustor, and a bypass valve provided on the bypass line and configured to adjust a bleed flow that is a flow rate of the compressed air flowing through the bypass line. The compressor includes a suction amount adjuster having a vane capable of being opened and closed so that the suction amount that is a flow rate of air suctioned by the compressor is able to be adjusted.

The control program for the gas turbine causes a computer to perform a fuel control step of determining the fuel flow rate in accordance with a target output for the gas turbine and indicating a valve opening degree to the fuel valve so that the determined fuel flow rate is reached; a suction amount control step of determining opening and closing angles of the vane in accordance with the actual output of the gas turbine and issuing an instruction to the suction amount adjuster so that the determined opening and closing angles of the vane are reached; and a bleed flow control step of determining a valve opening degree of the bypass valve in accordance with the actual output and issuing an instruction to the bypass valve so that the determined valve opening degree is reached. The fuel flow rate is determined so that the fuel flow rate gradually decreases as the target output decreases and the valve opening degree is indicated to the fuel valve so that the determined fuel flow rate is reached in the fuel control step. The suction amount control step includes a first suction amount control step and a second suction amount control step. The bleed flow control step includes a first bleed flow control step and a second bleed flow control step. When the actual output is in a first output range from a first output less than or equal to a rated output of the gas turbine to a second output that is an output less than the first output, the opening and closing angles of the vane are determined so that the suction amount gradually decreases as the actual output decreases and the opening and closing angles of the vane are indicated to the suction amount adjuster in the first suction amount control step, and an instruction is issued to the bypass valve so that the bypass valve is closed in the first bleed flow control step. When the actual output is in a second output range from the second output to a third output that is an output less than the second output, the opening and closing angles of the vane are determined so that the suction amount gradually decreases as the actual output decreases or the suction amount becomes constant even if the actual output decreases and the opening and closing angles of the vane are indicated to the suction amount adjuster in the second suction amount control step, and an instruction is issued to the bypass valve so that the bleed flow gradually increases as the actual output decreases and the bypass valve is fully opened when the actual output of the gas turbine becomes the third output in the second bleed flow control step.

The storage medium is a non-transitory computer-readable storage medium storing the above-described control program.

By causing the computer to execute the control program of the present aspect, as in the control method according to the above-described aspect, it is possible to reduce the output of the gas turbine while stably operating the gas turbine, suppress the decrease in the durability of the suction amount adjuster, and reduce the exhaust amount of the unburned component.

A gas turbine control device serving as an aspect for achieving the above-described objective is applied to the following gas turbine.

The gas turbine includes a compressor configured to compress air to generate the compressed air, a combustor configured to burn fuel in the compressed air to generate combustion gas, a turbine driven by the combustion gas, a fuel line connected to the combustor so that the fuel is able to be supplied to the combustor, a fuel valve provided on the fuel line and configured to adjust a fuel flow rate that is a flow rate of the fuel flowing into the fuel line, a bypass line configured to externally exhaust a part of the compressed air from the compressor without involving the combustor, and a bypass valve provided on the bypass line and configured to adjust a bleed flow that is a flow rate of the compressed air flowing through the bypass line. The compressor includes a suction amount adjuster having a vane capable of being opened and closed so that the suction amount that is a flow rate of air suctioned by the compressor is able to be adjusted.

The gas turbine control device includes a fuel controller configured to determine the fuel flow rate in accordance with a target output for the gas turbine and indicate a valve opening degree to the fuel valve so that the determined fuel flow rate is reached; a suction amount controller configured to determine opening and closing angles of the vane in accordance with the actual output of the gas turbine and issue an instruction to the suction amount adjuster so that the determined opening and closing angles of the vane are reached; and a bleed flow controller configured to determine a valve opening degree of the bypass valve in accordance with the actual output and issue an instruction to the bypass valve so that the determined valve opening degree is reached. The fuel controller determines the fuel flow rate corresponding to the target output so that the fuel flow rate gradually decreases as the target output decreases and the valve opening degree is indicated to the fuel valve so that the determined fuel flow rate is reached. The suction amount controller is able to perform a first suction amount control step and a second suction amount control step. The bleed flow controller is able to perform a first bleed flow control step and a second bleed flow control step. When the actual output is in a first output range from a first output less than or equal to a rated output of the gas turbine to a second output that is an output less than the first output, the suction amount controller determines the opening and closing angles of the vane so that the suction amount gradually decreases as the actual output decreases and the opening and closing angles of the vane are indicated to the suction amount adjuster in the first suction amount control step, and the bleed flow controller issues an instruction to the bypass valve so that the bypass valve is closed in the first bleed flow control step. When the actual output is in a second output range from the second output to a third output that is an output less than the second output, the suction amount controller determines the opening and closing angles of the vane so that the suction amount gradually decreases as the actual output decreases or the suction amount becomes constant even if the actual output decreases and the opening and closing angles of the vane are indicated to the suction amount adjuster in the second suction amount control step, and the bleed flow controller issues an instruction to the bypass valve so that the bleed flow gradually increases as the actual output decreases and the bypass valve is fully opened when the actual output of the gas turbine becomes the third output in the second bleed flow control step.

In the present aspect, as in the control method in the first aspect, it is possible to reduce the output of the gas turbine while stably operating the gas turbine, suppress the decrease in the durability of the suction amount adjuster, and reduce the exhaust amount of the unburned component.

According to an aspect for achieving the above-described objective, there is provided a gas turbine facility including: the control device for the gas turbine according to the above-described aspect; and the gas turbine.

In one aspect of the present disclosure, it is possible to reduce the output of the gas turbine while stably operating the gas turbine, suppress the decrease in the durability of the suction amount adjuster, and reduce the exhaust amount of the unburned component.

DETAILED DESCRIPTION OF THE INVENTION

Hereinafter, embodiments of a control method for a gas turbine according to the present invention, a control program for performing the method, a control device for performing the method, and a gas turbine facility including the control device will be described with reference to the drawings.

"First Embodiment of Gas Turbine Facility"

Hereinafter, a first embodiment of the gas turbine facility will be described with reference to FIGS. 1 to 10.

Figure 1:
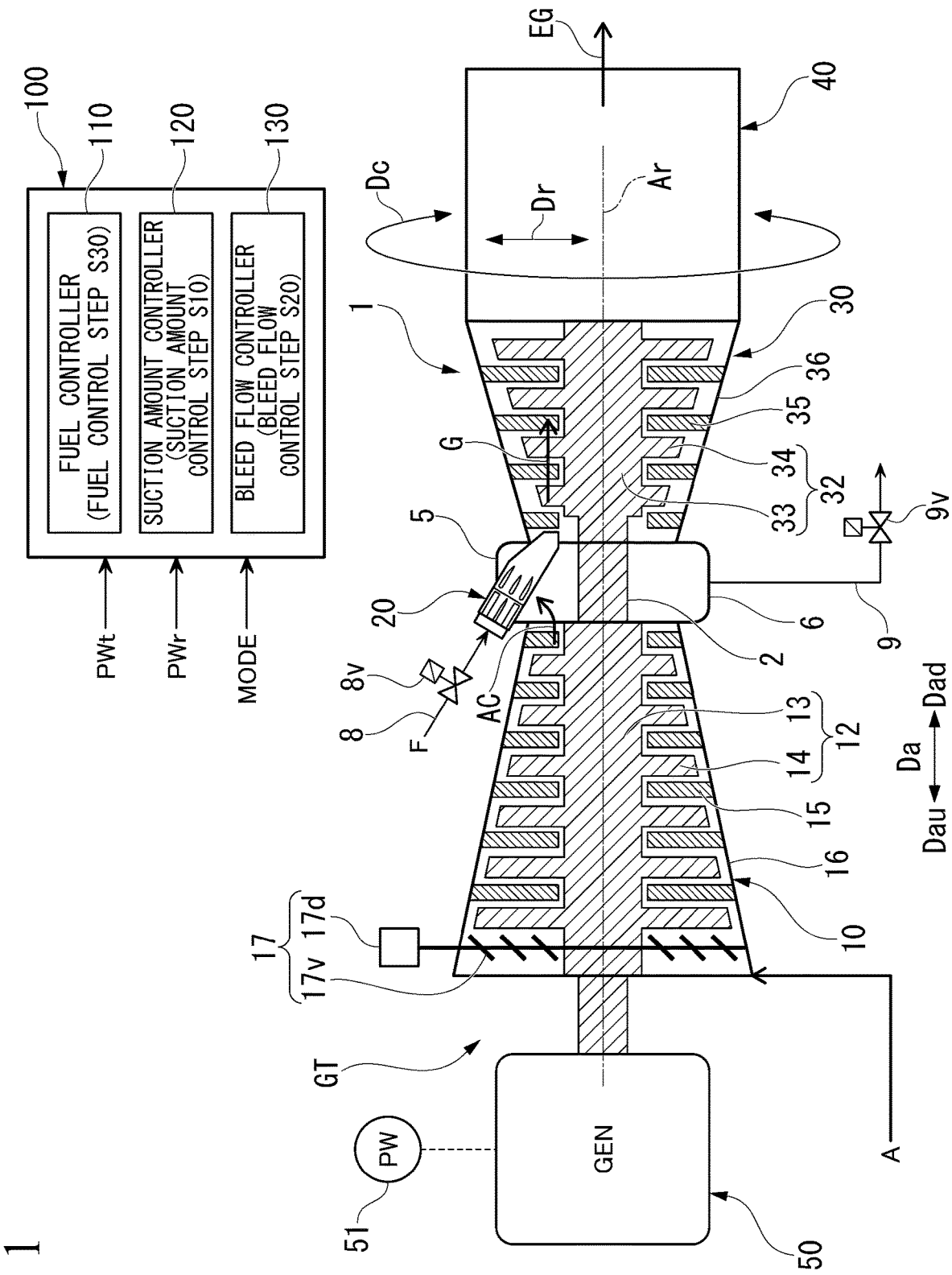
FIG. 1 is a schematic configuration diagram of a gas turbine facility in a first embodiment according to the present disclosure.

As shown in FIG. 1, the gas turbine facility of the present embodiment includes a gas turbine GT, a power generator 50 configured to generate electric power by driving the gas turbine GT, and a control device 100 configured to control a control target in the gas turbine GT.

The gas turbine GT includes a gas turbine body 1, a fuel line 8, a fuel valve 8*v*, a bypass line 9, and a bypass valve 9*v*.

The gas turbine body I includes a compressor 10 configured to compress air A to generate compressed air CA, a combustor 20 configured to burn fuel F in compressed air CA to generate combustion gas G, a turbine 30 driven by the high-temperature and high-pressure combustion gas G, and an exhaust casing 40 into which exhaust gas EG, which is the combustion gas G exhausted from the turbine 30, flows.

The compressor 10 includes a compressor rotor 12 configured to rotate around an axis Ar, a compressor casing 16 configured to cover the compressor rotor 12, a plurality of vane arrays 15, and a suction amount adjuster 17 (hereinafter referred to as an IGV 17). The turbine 30 includes a turbine rotor 32 configured to rotate around the axis Ar, a turbine casing 36 configured to cover the turbine rotor 32, and a plurality of vanes 35. Hereinafter, a direction in which the axis Ar extends is defined as an axial direction Da, the circumferential direction centered on the axis Ar is simply defined as a circumferential direction Dc, and a direction perpendicular to the axis Ar is defined as a radial direction Dr. Also, one side of the axial direction Da is an upstream axial side Dau and the other side is a downstream axial side Dad. Also, a side close to the axis Ar in the radial direction Dr is defined as a radial inner side Dri and the opposite side is defined as a radial outer side Dro.

The compressor 10 is disposed on the upstream axial side Dau with respect to the turbine 30. Also, the exhaust casing 40 is disposed on the downstream axial side Dad with respect to the turbine 30.

The compressor rotor 12 and the turbine rotor 32 are located on the same axis Ar and are connected to each other to form the gas turbine rotor 2. A rotor of the power generator 50 is connected to the gas turbine rotor 2. A power meter 51 configured to detect the electric power generated by the power generator 50 is connected to the power generator 50 or the power line connected to the power generator 50. The gas turbine body 1 further includes an intermediate casing 5. The intermediate casing 5 is disposed between the compressor casing 16 and the turbine casing 36 in the axial direction Da. The compressor casing 16, the intermediate casing 5, the turbine casing 36, and the exhaust casing 40 are connected to each other to form the gas turbine casing 6.

The compressor rotor 12 includes a rotor shaft 13 extending in the axial direction Da centered on the axis Ar and a plurality of blade arrays 14 attached to the rotor shaft 13. The plurality of blade arrays 14 are arranged in the axial direction Da. Each blade array 14 is composed of a plurality of blades arranged in the circumferential direction Dc. One of the plurality of vane arrays 15 is disposed on the downstream axial side Dad of each of the plurality of blade arrays 14. Each vane array 15 is provided inside of the compressor casing 16. Each vane array 15 is composed of a plurality of vanes arranged in the circumferential direction Dc. The IGV 17 includes a plurality of vanes 17v provided in a suction port of the compressor casing 16 and a drive 17d configured to drive the plurality of vanes 17v. The IGV 17 can adjust the suction amount, which is the flow rate of air suctioned into the compressor casing 16, by causing the drive 17d to open and close the plurality of vanes 17v.

The turbine rotor 32 includes a rotor shaft 33 extending in the axial direction Da centered on the axis Ar and a plurality of blade arrays 34 attached to the rotor shaft 33. The plurality of blade arrays 34 are arranged in the axial direction Da. Each blade array 34 is composed of a plurality of blades arranged in the circumferential direction Dc. One of the plurality of vane arrays 35 is disposed on the upstream axial side Dau of each of the plurality of blade arrays 34. Each vane array 35 is provided inside of the turbine casing 36. Each vane array 35 is composed of a plurality of vanes arranged in the circumferential direction Dc.

The fuel line 8 can connect a fuel supply source and the combustor 20 to guide the fuel F from the fuel supply source to the combustor 20. The fuel valve 8v is provided in the fuel line 8 and can adjust a fuel flow rate, which is the flow rate of the fuel F flowing through the fuel line 8. One end of the bypass line 9 is connected to the intermediate casing 5 and the other end of the bypass line 9 is open to the atmosphere as an example. Thus, the bypass line 9 can externally exhaust a part of the compressed air CA discharged from the compressor 10 to the inside of the intermediate casing 5 without involving the combustor 20. The bypass valve 9v can adjust a bleed flow, which is a flow rate of compressed air CA flowing through the bypass line 9.

The control device 100 includes a fuel controller 110 configured to control an opening degree of the fuel valve 8v, a suction amount controller 120 configured to control opening and closing angles of the plurality of vanes 17v of the IGV 17 (hereinafter referred to as IGV opening degrees θ), and a bleed flow controller 130 configured to control an opening degree of the bypass valve 9v.

Figure 2:
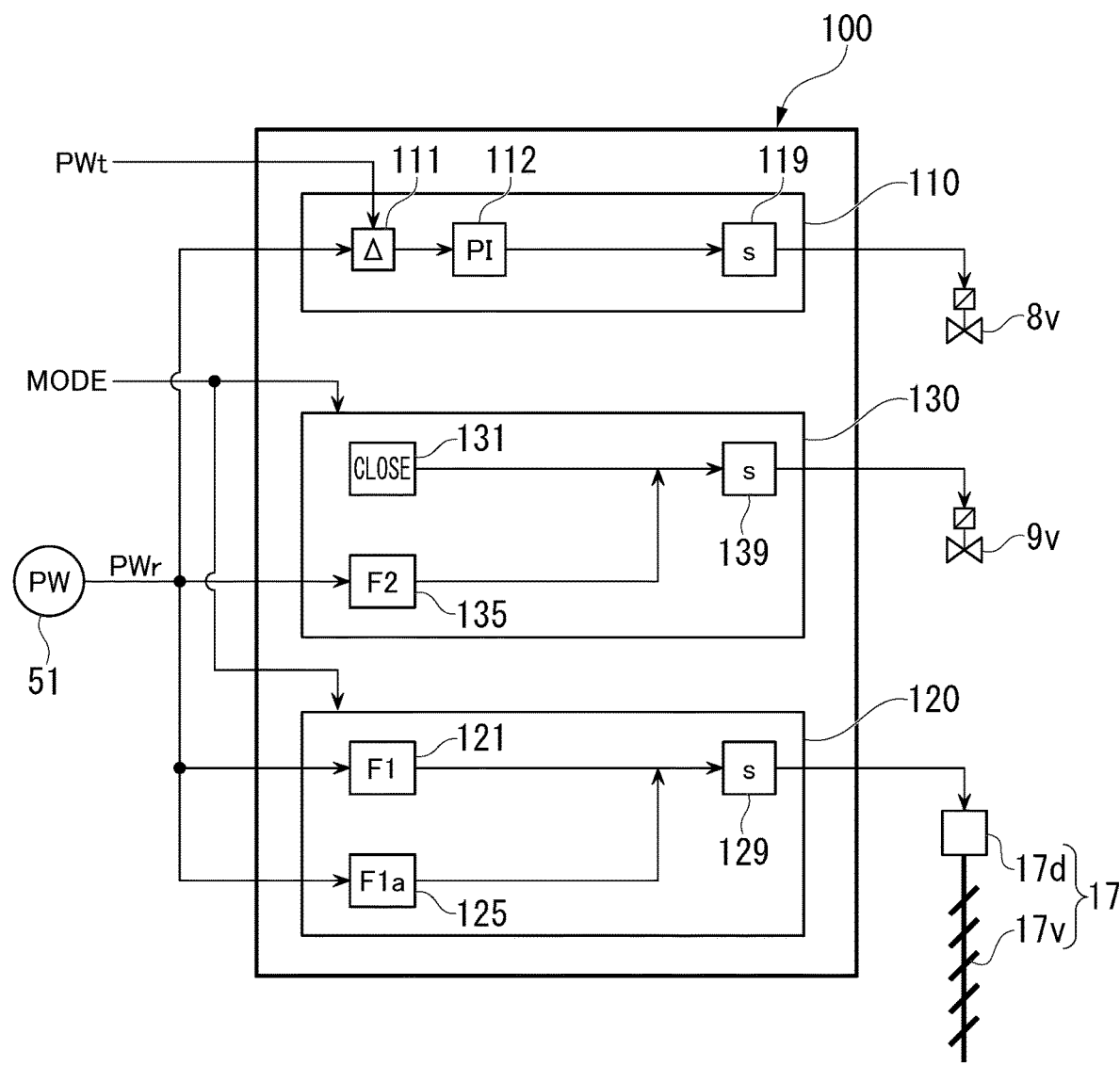
FIG. 2 is a functional block diagram of a control device in the first embodiment according to the present disclosure.

As shown in FIG. 2, the fuel controller 110 can externally receive a target output PWt of the gas turbine GT and an actual output of the gas turbine GT (hereinafter referred to as an actual output PWr), which is the electric power detected by the power meter 51.

The fuel controller 110 includes a difference calculator 111 configured to calculate a difference Δ between the target output PWt of the gas turbine GT and the actual output PWr of the gas turbine GT, a proportional integrator 112 configured to perform a proportional integration process for the difference Δ, and a control signal generator 119 configured to generate a control signal for the fuel valve 8v. The output from the proportional integrator 112 is a fuel flow rate. The control signal generator 119 creates a control signal for the fuel valve 8v using the fuel flow rate obtained by the fuel controller 110 and sends this control signal to the fuel valve 8v.

The suction amount controller 120 can receive an actual output PWr and execution instructions for various types of control modes. As various types of control modes, there are a bleed flow control mode and a normal control mode. The suction amount controller 120 includes a first IGV opening degree generator 121 configured to generate an IGV opening degree θ at the time of the normal control mode, a second IGV opening degree generator 125 configured to generate an IGV opening degree θ at the time of the bleed flow control mode, and a control signal generator 129 configured to generate a control signal for the IGV 17.

The first IGV opening degree generator 121 holds a function F1 indicating a relationship between the actual output PWr and the IGV opening degree θ in the normal control mode. The first IGV opening degree generator 121 generates an IGV opening degree θ corresponding to the actual output PWr using this function F1. The second IGV opening degree generator 125 holds a function F1a indicating a relationship between the actual output PWr and the IGV opening degree θ in the bleed flow control mode. The second IGV opening degree generator 125 generates an IGV opening degree θ corresponding to the actual output PWr using this function F1a.

The control signal generator 129 creates the control signal for the IGV 17 using the IGV opening degree θ) from the first IGV opening degree generator 121 and the IGV opening degree θ from the second IGV opening degree generator 125 and sends the control signal to the IGV 17.

The suction amount controller 120 can receive the actual output PWr and execution instructions for various types of control modes. The bleed flow controller 130 includes a first bypass valve opening degree generator 131 configured to generate a valve opening degree of the bypass valve 9v at the time of the normal control mode, a second bypass valve opening degree generator 135 configured to generate a valve opening degree of the bypass valve 9v at the time of the bleed flow control mode, and a control signal generator 139 configured to generate a control signal for the bypass valve 9v.

The first bypass valve opening degree generator 131 generates an opening degree of 0, i.e., a closed state, as the valve opening degree of the bypass valve 9V. The second bypass valve opening degree generator 135 holds a function F2 indicating a relationship between the actual output PWr and the valve opening degree of the bypass valve 9v at the time of the bleed flow control mode. The second bypass valve opening degree generator 135 generates an opening degree of the bypass valve 9v corresponding to the actual output PWr using this function F2.

The control signal generator 139 creates a control signal for the bypass valve 9v using the valve opening degree from the first bypass valve opening degree generator 131 and the valve opening degree from the second bypass valve opening degree generator 135 and sends this control signal to the bypass valve 9v.

The function F1, the function F1a, and the function F2 described above will be described below.

Figure 3:
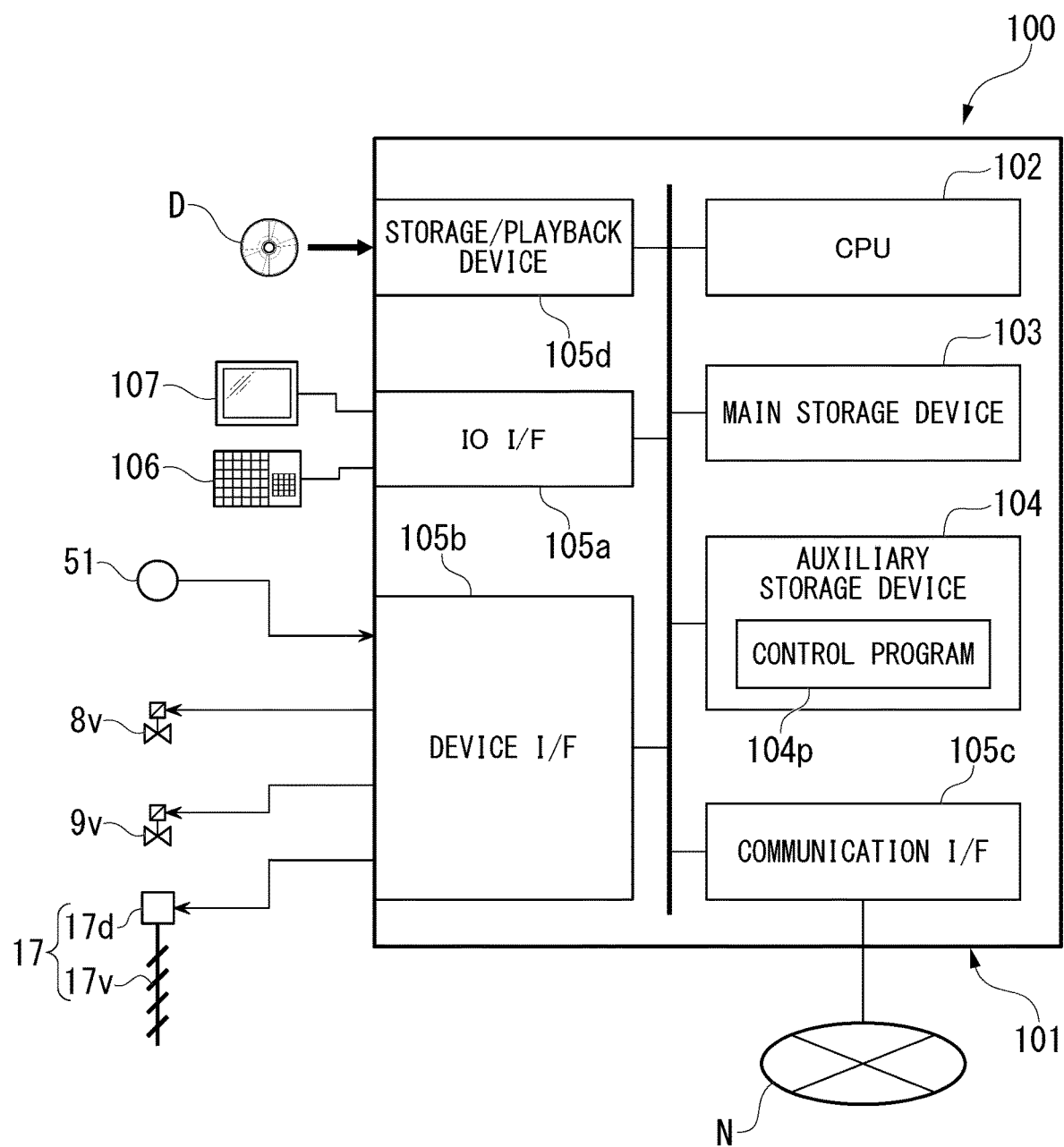
FIG. 3 is a hardware configuration diagram of the control device in the first embodiment according to the present disclosure.

The control device 100 is a computer. The control device 100 includes a computer body 101, an input device 106 such as a keyboard or mouse, and a display device 107 in hardware as shown in FIG. 3. The computer body 101 includes a central processing unit (CPU) 102 configured to perform various types of calculations, a main storage device 103 such as a memory that serves as a work area of the CPU 102, an auxiliary storage device 104 such as a hard disk drive device, and a storage/playback device 105d configured to perform a data storage process and a playback process on a disk-type storage medium D, an input/output interface 105a for the input device 106 and the display device 107, a device interface 105b, and a communication interface 105c configured to communicate with an external device via a network N.

The power meter 51, the fuel valve 8v, the bypass valve 9v, and the drive 17d of the IGV 17 are connected to the device interface 105b via a signal line or the like.

The auxiliary storage device 104 stores a control program 104p or the like in advance. The control program 104p is input from the disk-type storage medium D to the auxiliary storage device 104 via the storage/playback device 105d as an example. Also, the control program 104p may be input from an external device to the auxiliary storage device 104 via the communication interface 105c. Functional units of the control device 100, i.e., the fuel controller 110, the suction amount controller 120, and the bleed flow controller 130 all function when the CPU 102 executes the control program 104p stored in the auxiliary storage device 104.

Next, a basic operation of the above-described gas turbine GT will be briefly described. The compressor 10 suctions air A and compresses the air A to generate compressed air CA. At this time, the suction amount, which is the flow rate of the air A suctioned by the compressor 10, is adjusted by the IGV 17. The compressed air CA from the compressor 10 flows into the combustor 20 via the intermediate casing 5. In this regard, a part of the compressed air CA from the compressor 10 may be externally exhausted via the intermediate casing 5, the bypass line 9, and the bypass valve 9v. Also, the fuel F is externally supplied to the combustor 20 via the fuel line 8 and the fuel valve 8v. The combustor 20 burns the fuel F in the compressed air CA to generate a high-temperature and high-pressure combustion gas G. The combustion gas G is sent to the turbine 30 and drives the turbine 30. That is, the turbine rotor 32 rotates. As a result, the power generator 50 generates electric power. The combustion gas G exhausted from the turbine 30 is externally exhausted as exhaust gas EG or flows into an exhaust heat recovery boiler (not shown).

Figure 4:
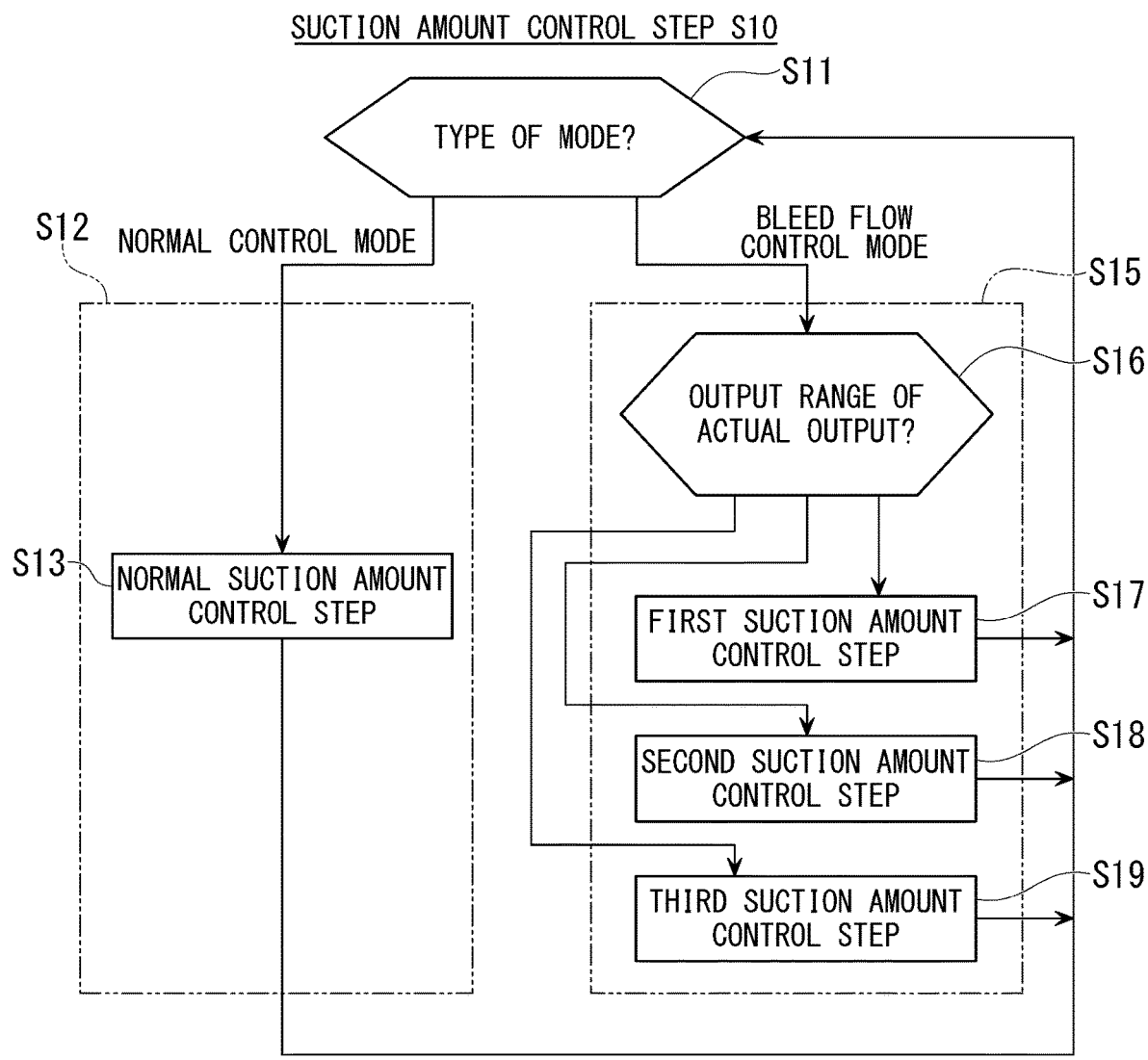
FIG. 4 is a flowchart showing processing content in a suction amount control step executed by the control device in the first embodiment according to the present disclosure.
Figure 5:
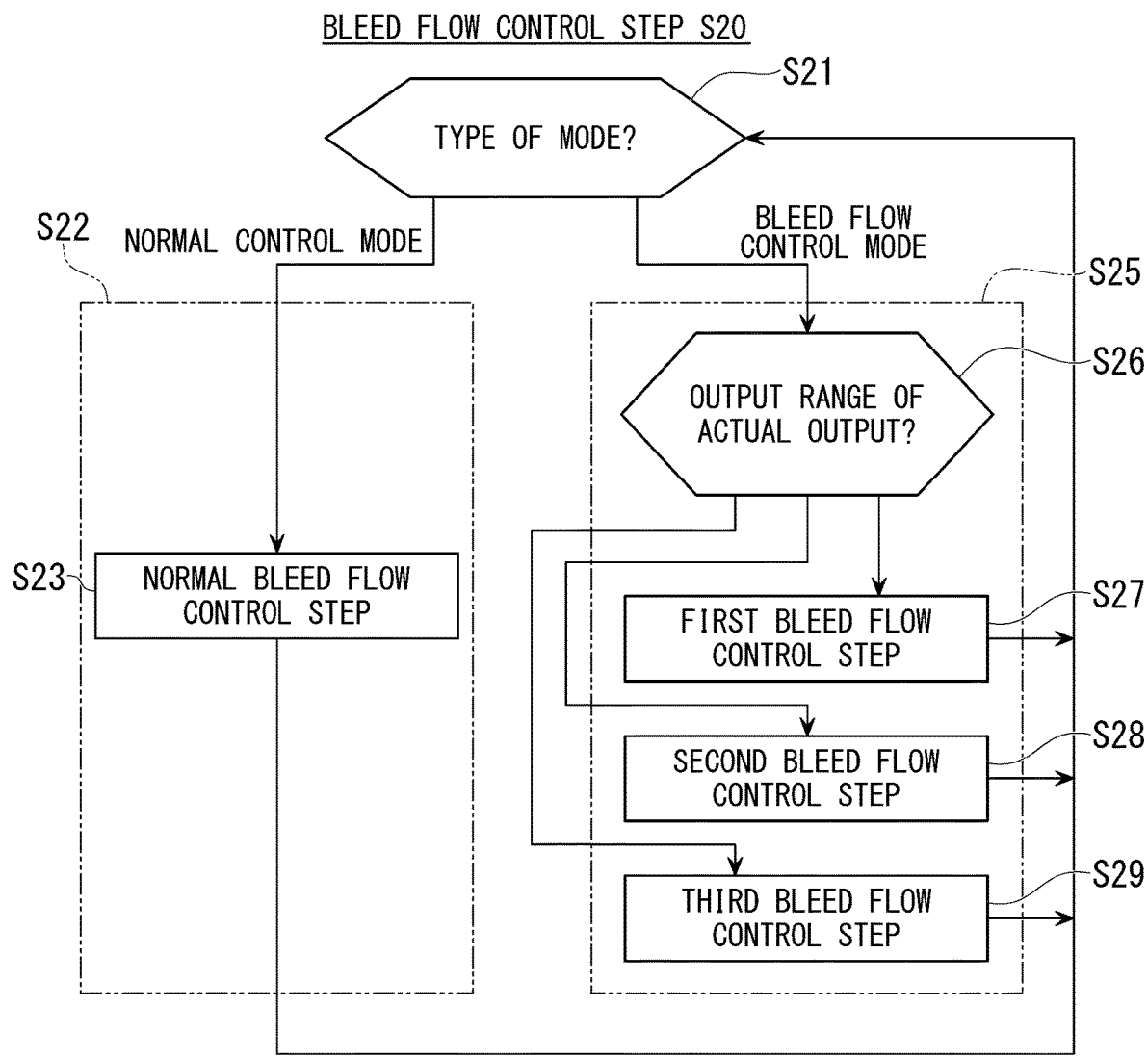
FIG. 5 is a flowchart showing processing content in a bleed flow control step executed by the control device in the first embodiment according to the present disclosure.

Next, an operation of the control device 100 and an operation of the gas turbine GT associated with the operation of the control device 100 will be described with reference to the flowcharts shown in FIGS. 4 and 5. Also, the flowcharts shown in FIGS. 4 and 5 show the operation of the control device 100 when the gas turbine GT is operated within an output range less than or equal to a rated output. Also, FIG. 4 shows processing content in a suction amount control step S10 executed by the suction amount controller 120 of the control device 100 and FIG. 5 shows processing content in a bleed flow control step S20 executed by the bleed flow controller 130 of the control device 100.

As shown in the flowchart of FIG. 4, in the suction amount control step S10, the suction amount controller 120 first determines a currently indicated control mode (a mode determination step S11). When the currently indicated control mode is a normal control mode, the suction amount controller 120 performs a normal control mode S12. The suction amount controller 120 performs a normal suction amount control step S13 in this normal control mode S12. In the normal suction amount control step S13, the first IGV opening degree generator 121 of the suction amount controller 120 generates an IGV opening degree θ corresponding to the actual output PWr using the function F1. As indicated by the dashed line in a graph of FIG. 6, the function F1 is set so that the IGV opening degree θ gradually decreases with the decrease in the output of the gas turbine, i.e., the IGV 17 is gradually closed to decrease the suction amount. The control signal generator 129 creates a control signal using the IGV opening degree θ from the first IGV opening degree generator 121 and sends this control signal to the IGV 17.

Figure 6:
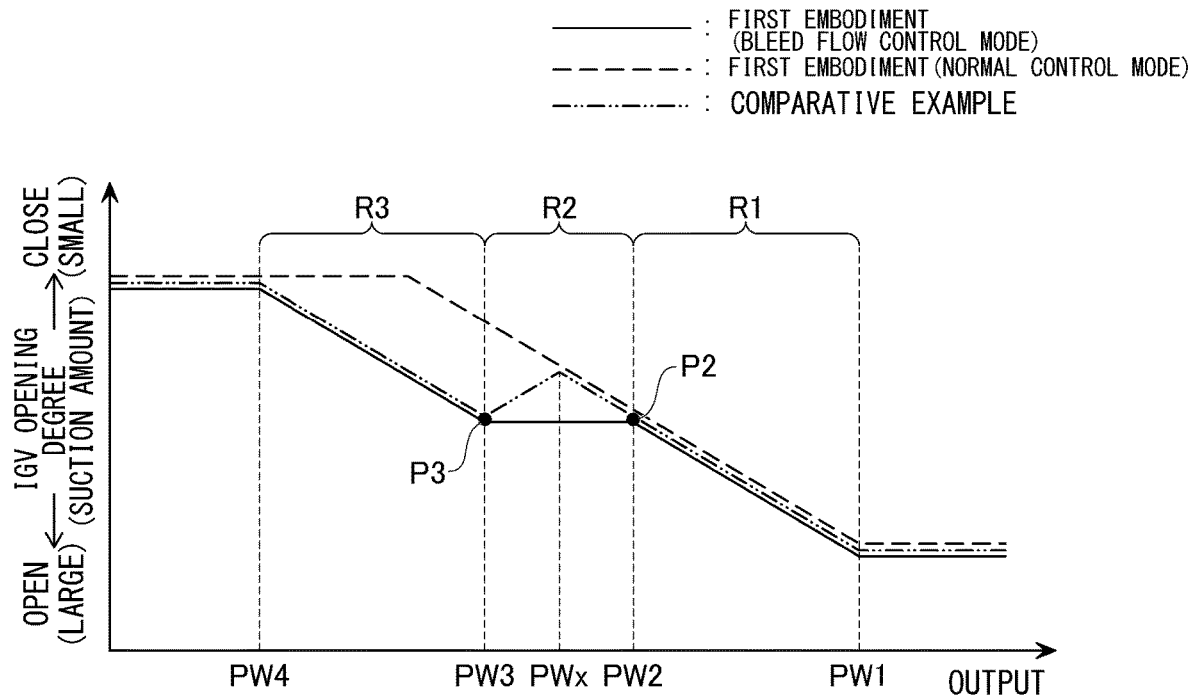
FIG. 6 is a graph showing a relationship between an output of a gas turbine and an IGV opening degree (or a suction amount) in the first embodiment according to the present disclosure.

Also, in the graph of FIG. 6, the horizontal axis represents an output of the gas turbine and the vertical axis represents an IGV opening degree (a suction amount). Also, in the graphs of FIGS. 6 to 10, PW1 indicates a first output PW1 less than or equal to the rated output of the gas turbine, PW2 indicates a second output PW2 that is an output less than the first output PW1, PW3 indicates a third output PW3 that is an output less than the second output PW2, and PW4 indicates a fourth output PW4 that is an output less than the third output PW3. Also, in these graphs, R1 indicates a first output range R1, which is an output range from the first output PW1 to the second output PW2, R2 indicates a second output range R2, which is an output range from the second output PW2 to the third output PW3, and R3 indicates a third output range R3, which is an output range from the third output PW3 to the fourth output PW4.

When it is determined that the currently indicated control mode is the bleed flow control mode in the mode determination step S11, the suction amount controller 120 performs the bleed flow control mode S15. The suction amount controller 120 determines an output range in which an actual output of the gas turbine is in the bleed flow control mode S15 (an output range determination step S16). The suction amount controller 120 performs the first suction amount control step S17 when the actual output is within the first output range R1. In the first suction amount control step S17, the second IGV opening degree generator 125 of the suction amount controller 120 generates an IGV opening degree θ corresponding to the actual output PWr within the first output range R1 using the function F1a. As indicated by the solid line in the graph of FIG. 6, within the first output range R1, the function F1a is set so that the IGV opening degree θ gradually decreases with the decrease in the actual output, i.e., the IGV 17 is gradually closed to decrease the suction amount. Also, the relationship between the actual output of the function F1 used in the normal control mode S12 and the IGV opening degree θ and the relationship between the actual output of the function F1*a* used in the bleed flow control mode S15 and the IGV opening degree θ are the same within the first output range R1. The control signal generator 129 creates a control signal using the IGV opening degree θ from the second IGV opening degree generator 125 and sends this control signal to the IGV 17.

Also, when it is determined that the actual output of the gas turbine is within the second output range R2 in the output range determination step S16, the suction amount controller 120 performs the second suction amount control step S18. In the second suction amount control step S18, the second IGV opening degree generator 125 of the suction amount controller 120 generates an IGV opening degree θ corresponding to the actual output PWr within the second output range R2 using the function F1*a*. As indicated by the solid line in the graph of FIG. 6, this function F1*a* is set so that the IGV opening degree θ is constant, i.e., the suction amount is constant, even if the actual output decreases in the second output range R2. The control signal generator 129 creates a control signal using the IGV opening degree θ from the second IGV opening degree generator 125 and sends this control signal to the IGV 17.

Also, when it is determined that the actual output of the gas turbine is within the third output range R3 in the output range determination step S16, the suction amount controller 120 performs the third suction amount control step S19. In the third suction amount control step S19, the second IGV opening degree generator 125 of the suction amount controller 120 generates an IGV opening degree θ corresponding to the actual output PWr within the third output range R3 using the function F1*a*. As indicated by the solid line in the graph of FIG. 6, within the third output range R3, the function F1*a* is set so that the IGV opening degree θ gradually decreases with the decrease in the actual output, i.e., the IGV 17 is gradually closed to decrease the suction amount, and the IGV opening degree θ becomes minimum when the actual output becomes the fourth output PW4, i.e., the IGV 17 is closed so that the suction amount becomes minimum. The control signal generator 129 creates a control signal using the IGV opening degree θ from the second IGV opening degree generator 125 and sends this control signal to the IGV 17.

As shown in the flowchart of FIG. 5, in the bleed flow control step S20, the bleed flow controller 130 first determines a currently indicated control mode (a mode determination step S21). When the currently indicated control mode is a normal control mode, the bleed flow controller 130 executes the normal control mode S22. The bleed flow controller 130 executes the normal bleed flow control step S23 in this normal control mode S22. In the normal bleed flow control step S23, the first bypass valve opening degree generator 131 of the bleed flow controller 130 generates an opening degree of 0, i.e., a closed state, as the valve opening degree of the bypass valve 9*v*. The control signal generator 139 creates a control signal using the valve opening degree of the bypass valve 9*v* from the first bypass valve opening degree generator 131 and sends this control signal to the bypass valve 9*v*. Consequently, in the normal control mode S22, the bypass valve 9*v* is maintained in a closed state regardless of a value of the actual output.

The bleed flow controller 130 performs the bleed flow control mode S25 when it is determined that the currently indicated control mode is the bleed flow control mode in the mode determination step S21. The bleed flow controller 130 determines an output range in which the actual output of the gas turbine is in the bleed flow control mode S25 (an output range determination step S26). When the actual output of the gas turbine is within the first output range R1, the bleed flow controller 130 performs the first bleed flow control step S27. In the first bleed flow control step S27, the second bypass valve opening degree generator 135 of the bleed flow controller 130 generates a valve opening degree of the bypass valve 9*v* corresponding to the actual output PWr within the first output range R1 using the function F2. As indicated by the solid line in the graph of FIG. 7, this function F2 generates an opening degree of 0, i.e., a closed state, as the valve opening degree of the bypass valve 9*v* in the first output range R1. The control signal generator 139 creates a control signal using the valve opening degree from the second bypass valve opening degree generator 135 and sends this control signal to the bypass valve 9V. Consequently, in the first bleed flow control step S27, the bypass valve 9*v* is maintained in a closed state regardless of a value of the actual output within the first output range R1.

Also, when it is determined that the actual output of the gas turbine is within the second output range R2 in the output range determination step S26, the bleed flow controller 130 performs the second bleed flow control step S28. In the second bleed flow control step S28, the second bypass valve opening degree generator 135 of the bleed flow controller 130 generates an opening degree of the bypass valve 9*v* corresponding to the actual output PWr within the second output range R2 using the function F2. As indicated by the solid line in the graph of FIG. 7, the function F2 is set so that the bypass valve 9*v* is fully opened when the valve opening degree of the bypass valve 9*v* gradually increases with the decrease in the actual output within the second output range R2, i.e., the bleed flow gradually increases, and the bypass valve 9*v* is fully opened when the actual output becomes the third output PW3. The control signal generator 139 creates a control signal using the valve opening degree from the second bypass valve opening degree generator 135 and sends this control signal to the bypass valve 9V. Consequently, when the actual output becomes the third output PW3, the bypass valve 9*v* is fully opened and the ratio of the bleed flow to the suction amount becomes maximum.

Also, when it is determined that the actual output of the gas turbine is within the third output range R3 in the output range determination step S26, the bleed flow controller 130 performs the third bleed flow control step S29. In the third bleed flow control step S29, the second bypass valve opening degree generator 135 of the bleed flow controller 130 generates a valve opening degree of the bypass valve 9*v* corresponding to the actual output PWr within the third output range R3 using the function F2. As indicated by the solid line in the graph of FIG. 7, this function F2 generates a full opening degree as the valve opening degree of the bypass valve 9*v* within the third output range R3. The control signal generator 139 creates a control signal using the valve opening degree from the second bypass valve opening degree generator 135 and sends this control signal to the bypass valve 9V. Consequently, in the third bleed flow control step S29, the bypass valve 9*v* is maintained in a fully opened state regardless of a value of the actual output within the third output range R3. That is, the ratio of the bleed flow to the suction amount is maintained at a maximum regardless of a value of the actual output within the third output range R3.

The fuel controller 110 performs the fuel control step S30. In the fuel control step S30, the difference calculator 111 of the fuel controller 110 obtains a difference Δ between the target output PWt from the outside and the actual output PWr from the power meter 51. Subsequently, the proportional integrator 112 of the fuel controller 110 performs a proportional integration process with respect to this difference Δ. The control signal generator 119 creates a control signal indicating the valve opening degree of the fuel valve 8v using the output from the proportional integrator 112 and sends this control signal to the fuel valve 8v. Thus, in the fuel control step S30, the fuel controller 110 determines a fuel flow rate according to the difference between the target output PWt and the actual output PWr and indicates a valve opening degree corresponding to the fuel flow rate to the fuel valve 8v. Therefore, the valve opening degree of the fuel valve 8v gradually decreases with a decrease in the target output PWt, in other words, the fuel flow rate gradually decreases with a decrease in the target output PWt as indicated by the solid line in the graph of FIG. 8.

The fuel controller 110 performs the same control regardless of the type of control mode and the range of the actual output of the gas turbine. That is, the fuel controller 110 determines the fuel flow rate in accordance with the difference between the target output PWt and the actual output PWr regardless of the type of control mode or the actual output range of the gas turbine and indicates the valve opening degree according to the fuel flow rate to the fuel valve 8v. In this regard, a flow rate change ratio, which is a ratio of the change in the fuel flow rate to a change in the actual output when the actual output of the gas turbine is within the second output range R2, is less than that when the actual output of the gas turbine is within the first output range R1 and the third output range R3 as indicated by the solid line in the graph of FIG. 8. This is because the suction amount and the bleed flow are different when the actual output of the gas turbine is within the second output range R2 and when the actual output of the gas turbine is within the first output range R1 and the third output range R3.

Next, a change in the temperature of the exhaust gas EG, which is combustion gas G exhausted from the turbine 30 and flowing into the exhaust casing, in the case where the fuel valve 8v, the IGV 17, and the bypass valve 9v are controlled as described above in the normal control mode and the bleed flow control mode will be described using FIG. 9.

Figure 9:
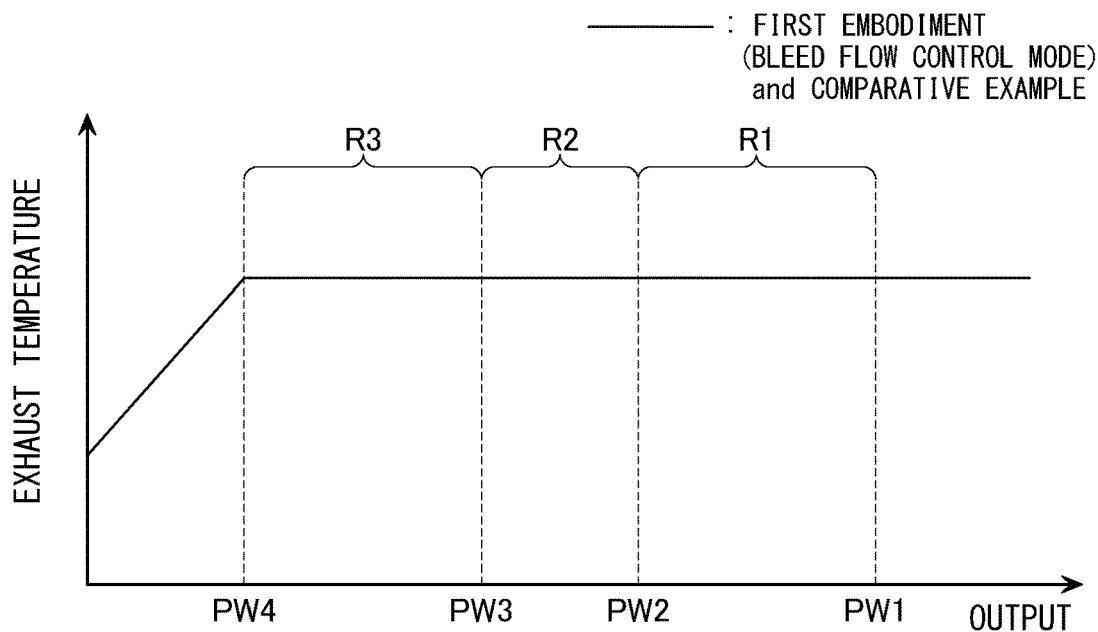
FIG. 9 is a graph showing a relationship between the output of the gas turbine and an exhaust temperature in the first embodiment according to the present disclosure.

Even though the normal control mode is performed or the bleed flow control mode is performed, the exhaust gas temperature is maintained at the allowable maximum temperature while the actual output is between the rated output and the fourth output PW4 as shown in FIG. 9. The allowable maximum temperature related to the exhaust gas temperature is a temperature predetermined in consideration of the fact that the parts constituting the gas turbine are likely to be damaged when the exhaust gas temperature is higher than the allowable maximum temperature. When the actual output is the fourth output PW4, the IGV opening degree θ is a minimum opening degree and the bypass valve 9v is fully opened. Thus, even if the actual output is lower than the fourth output PW4, the flow rate of the compressed air CA flowing into the combustor 20 cannot be reduced. On the other hand, the flow rate of fuel flowing into the combustor 20 gradually decreases as the target output PWt decreases even if the target output PWt is lower than the fourth output PW4. Consequently, when the actual output becomes less than the fourth output PW4, the exhaust gas temperature gradually decreases as the actual output decreases.

Next, a temperature of the combustion gas G at the inlet of the turbine 30 (hereinafter referred to as a turbine inlet temperature) when the fuel valve 8v, the IGV 17, and bypass valve 9v are controlled as described above in the bleed flow control mode will be described with reference to FIG. 10.

Even though the normal control mode is performed or the bleed flow control mode is performed, the turbine inlet temperature basically gradually decreases as the actual output decreases. In this regard, a temperature change ratio, which is a ratio of a decrease in the turbine inlet temperature due to the decrease in the actual output, when the actual output is within the second output range R2, is less than that when the actual output is within the first output range R1 and the third output range R3.

Meanwhile, as described above, the turbine inlet temperature gradually decreases with a decrease in actual output. On the other hand, the exhaust gas temperature is maintained at the allowable maximum temperature while the actual output is between the rated output and the fourth output PW4. This is because the fuel valve 8v, the IGV 17, and the bypass valve 9v are controlled as described above, an expansion rate of the combustion gas G within the turbine 30 decreases as the actual output decreases, and it is difficult for the exhaust gas temperature to decrease with respect to the decrease in the turbine inlet temperature.

Next, a difference between the turbine inlet temperature when the bypass valve 9v is closed and the turbine inlet temperature when the bypass valve 9v is fully opened will be described.

Here, it is assumed that the actual output when the bypass valve 9v is closed is the same as the actual output when the bypass valve 9v is fully opened and the exhaust gas temperature when the bypass valve 9v is closed is the same as the exhaust gas temperature when the bypass valve 9v is fully opened.

Under the above conditions, when the bypass valve 9v is closed, the output of the turbine 30 alone is assumed to be 300 MW. Also, because the compressor 10 operates in the operation of the turbine 30, the consumption output of the compressor 10 is assumed to be 100 MW, in other words, the output of the compressor 10 is assumed to be −100 MW. As a result, the actual output of the gas turbine becomes 200 MW (=300−100).

When the bypass valve 9v is fully opened, the compressed air CA generated by the compressor 10 is externally exhausted and the compressor 10 is working inefficiently. Thus, under the above conditions, the consumption output of the compressor 10 in which the bypass valve 9v is fully opened is greater than the consumption output of the compressor 10 when the bypass valve 9v is closed. Therefore, a consumption output of the compressor 10 at this time is 150 MW, in other words, the output of the compressor 10 is −150 MW. In order to set the actual output of the gas turbine at this time to 200 MW, which is the same as the actual output when the bypass valve 9v is closed, the output of the turbine 30 alone needs to be 350 MW (=200+150).

From the above, it is understood that the output (350 MW) of the turbine 30 alone when the bypass valve 9v is fully opened is greater than the output (300 MW) of the turbine 30 alone when the bypass valve 9v is closed if the exhaust gas temperature when the bypass valve 9v is fully opened is the same as the exhaust gas temperature when the bypass valve 9v is closed. Thus, at this time, the turbine inlet temperature when the bypass valve 9v is fully opened needs to be higher than the turbine inlet temperature when the bypass valve 9v is closed.

Consequently, under the above conditions, the turbine inlet temperature when the bypass valve 9v is fully opened is higher than the turbine inlet temperature when the bypass valve 9v is closed.

Figure 10:
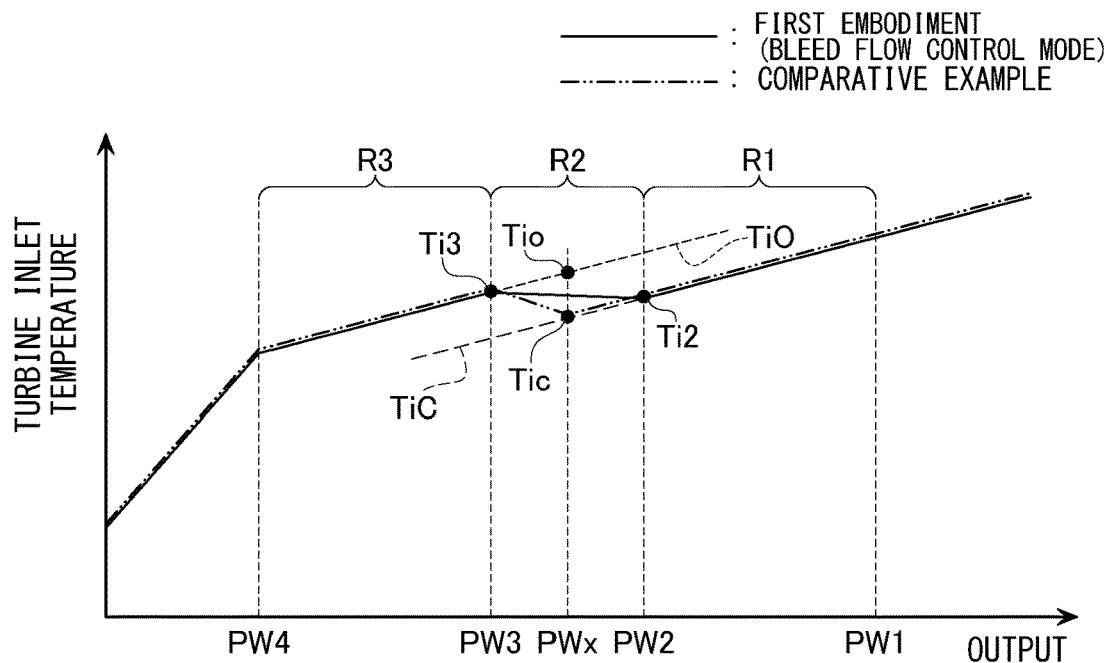
FIG. 10 is a graph showing a relationship between the output of the gas turbine and a turbine inlet temperature in the first embodiment according to the present disclosure.

In the exhaust discharge control mode, when the actual output is within the first output range R1, because the bypass valve 9v is closed, the turbine inlet temperature at this time becomes a temperature on a turbine inlet temperature line TiC when the bypass valve 9v is closed in the graph of FIG. 10. Also, in the bleed flow control mode, when the actual output is within the third output range R3, because the bypass valve 9v is fully opened, the turbine inlet temperature at this time becomes a temperature on a turbine inlet temperature line TiO when the bypass valve 9v is fully opened in the graph of FIG. 10. As described with reference to FIG. 9, the exhaust gas temperature when the actual output is in the third output range R3 is the same as the exhaust gas temperature when the actual output is in the first output range R1. Consequently, for the above-described reasons, a turbine inlet temperature Tio when the actual output is an output PWx on the bypass inlet temperature line TiO when the bypass valve 9v is fully opened is higher than a turbine inlet temperature Tic when the actual output is an output PWx on the bypass inlet temperature line TiC when the bypass valve 9v is closed.

A turbine inlet temperature Ti2 when the actual output is the second output PW2 is a temperature on the turbine inlet temperature line TiC when the bypass valve 9v is closed. Also, a turbine inlet temperature Ti3 when the actual output is the third output PW3 is a temperature on the turbine inlet temperature line TiO when the bypass valve 9v is fully opened. As described above, the turbine inlet temperature gradually decreases with a decrease in the actual output of the turbine 30. Thus, if the bypass valve 9v is kept closed, the turbine inlet temperature when the actual output is the third output PW3 will certainly be lower than the turbine inlet temperature Ti2 when the actual output is the second output PW2 greater than the third output PW3. However, the turbine inlet temperature Ti3 when the bypass valve 9v is fully opened and the actual output is the third output PW3 is a temperature on the turbine inlet temperature line TiO along which the turbine inlet temperature is higher than when the bypass valve is closed if the actual output is the same. Thus, the turbine inlet temperature Ti3 when the actual output is the third output PW3 is not very low with respect to the turbine inlet temperature Ti2 when the actual output is the second output PW2 greater than the third output PW3.

Consequently, the temperature change ratio within the second output range R2 between the second output PW2 and the third output PW3 is lower than the temperature change ratio within the first output range R1 as described above. In other words, the temperature change ratio from the time when the bypass valve 9v begins to open to the time when the bypass valve 9v is fully opened is lower than the temperature change ratio when the bypass valve 9v is fully closed.

Next, a method of creating a function F1a for determining a relationship between the actual output and the IGV opening degree θ (or the suction amount) at the time of the bleed flow control mode will be described.

When the function F1a is created, a value of the third output PW3 and a value of a third opening/closing angle which is an IGV opening degree when the actual output is the third output PW3 or a value of a third suction amount which is a suction amount at that time are determined under the following third output conditions. That is, the output value at the operating point P3 in the graph of FIG. 6 and the value of the IGV opening degree or the suction amount are determined.

The third output conditions are as follows.
 a. The bypass valve 9V is fully opened. In other words, the exhaust amount is largest.
 b. The exhaust gas temperature is a maximum allowable temperature.
 c. The temperature of the combustion gas G flowing into the turbine 30, i.e., the turbine inlet temperature, is a temperature when a concentration of the unburned component contained in the combustion gas G becomes an allowable maximum concentration.

Under the conditions b and c among the third output conditions, the temperature of the combustion gas G at the inlet of the turbine 30 and the temperature of the combustion gas G at the outlet of the turbine 30 are determined. Consequently, these temperatures determine the output value of the turbine 30 alone. When the output value of the turbine 30 alone is determined, the flow rate of the compressed air CA flowing into the combustor 20 is determined. When the flow rate of the compressed air CA flowing into the combustor 20 is determined, a third opening/closing angle which is a value of the IGV opening degree or a third suction amount that is a suction amount at that time is determined under condition a among the third output conditions. That is, a value of the IGV opening degree or the suction amount at a point P3 is determined. When the output value of the turbine 30 alone and the value of the IGV opening degree are determined, the output value of the gas turbine is determined. That is, the value of the third output PW3 at the point P3 is determined.

Next, under the following second output conditions, a value of the second output PW2 and a value of the second opening/closing angle which is an IGV opening degree when the actual output is the second output PW2 or a value of a second suction amount which is the suction amount at that time are determined. That is, an output value at an operating point P2 in the graph of FIG. 6 and a value of the IGV opening degree or suction amount are determined.

The second output conditions are as follows.
 a. A change trend of the IGV opening degree within the second output range R2 is a predetermined change trend and a change trend based on a point P3. In other words, a change trend of a suction amount within the second output range R2 is a predetermined change trend and a change trend based on the point P3.
 b. The bypass valve 9V is closed. In other words, the bleed flow is 0.
 c. The exhaust gas temperature is a maximum allowable temperature.

In the present embodiment, the IGV opening degree within the second output range R2 is constant even if the output of the gas turbine changes. Consequently, the condition a among the second output condition is that the IGV opening degree is constant within the second output range R2 through the point P3. Thus, the second opening/closing angle, which is the IGV opening degree at the point P2, becomes the IGV opening degree at the point P3. In other words, the second suction amount, which is the suction amount at the point P2, becomes the suction amount at the point P3. When the IGV opening degree at the point P2 is determined, the flow rate of the compressed air CA flowing into the combustor 20 is determined under the condition b among the second output conditions. When the flow rate of the compressed air CA flowing into the combustor 20 is determined, the output value of the turbine 30 alone is determined. When the output value of the turbine 30 alone and the value of the IGV opening degree are determined, the output value of the gas turbine is determined. That is, the value of the second output PW2 at the point P2 is determined.

As described above, when the output of the gas turbine and the IGV opening degree (the opening and closing angles of the vane 17v) at each of the points P3 and P2 are determined and when the change trend of the IGV opening degree with respect to the change in the actual output in the first output range R1 and the third output range R3 is determined, the function F1a is determined.

Next, a comparative example will be described to describe the effect when the bleed flow control mode of the present embodiment is executed.

In the comparative example, as indicated by the dashed double-dotted line in the graph of FIG. 6, it is assumed that the IGV opening degree θ changes with a change in the actual output. Specifically, when the actual output is between the rated output and the output PWx, which is an output less than the rated output, the IGV opening degree θ gradually decreases with the decrease in the actual output, i.e., the IGV 17 is gradually closed to decrease the suction amount. Also, the output PWx is an output less than the second output PW2 and greater than the third output PW3. Between the output PWx and the third output PW3 less than the output PWx, the IGV opening degree θ gradually increases with the decrease in the actual output, i.e., the IGV 17 is gradually opened to increase the suction amount. Also, between the third output PW3 and the fourth output PW4, which is an output less than the third output PW3, the IGV opening angle θ gradually decreases with the decrease in actual output, i.e., the IGV 17 is gradually closed to decrease the suction amount and the IGV opening angle θ becomes minimum when the actual output becomes the fourth output PW4, i.e., the IGV 17 is closed so that the suction amount becomes minimum.

Figure 7:
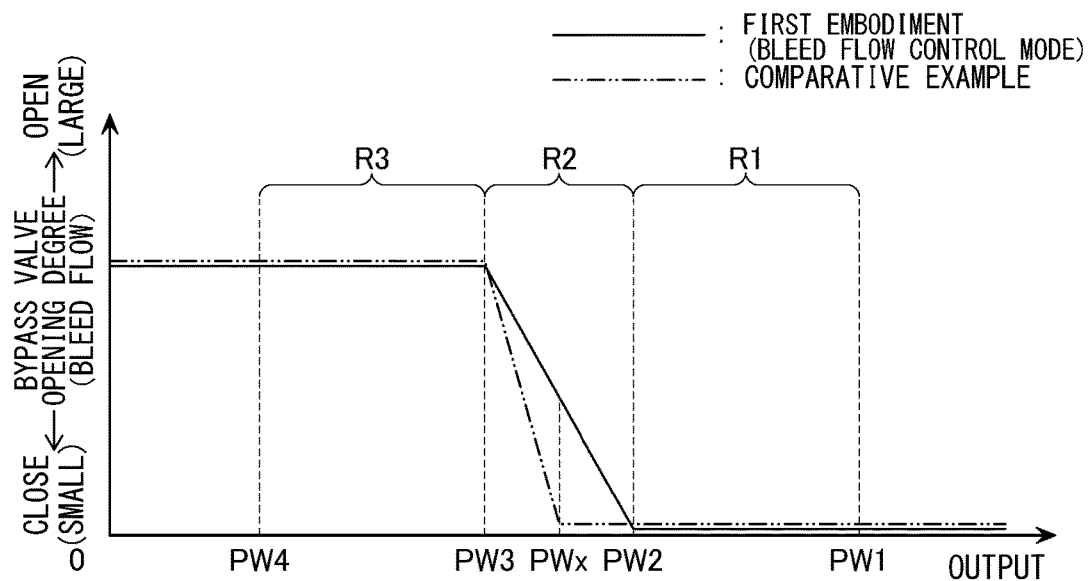
FIG. 7 is a graph showing a relationship between the output of the gas turbine and a bypass valve opening degree (or a bleed flow) in the first embodiment according to the present disclosure.

Also, in the comparative example, as indicated by the dashed double-dotted line in the graph of FIG. 7, it is assumed that the valve opening degree of the bypass valve 9v changes with a change in the actual output. Specifically, it is assumed that the valve opening degree of the bypass valve 9v is 0 while the actual output is between the rated output and the output PWx, i.e., the bypass valve 9v is maintained in a closed state. Between the output PWx and the third output PW3, the valve opening degree of the bypass valve 9v gradually increases with the decrease in the actual output, i.e., the bleed flow gradually increases, and the bypass valve 9v is fully opened when the actual output becomes the third output PW3. It is assumed that when the actual output is less than or equal to the third output PW3, the bypass valve 9v is maintained in a fully opened state.

Figure 8:
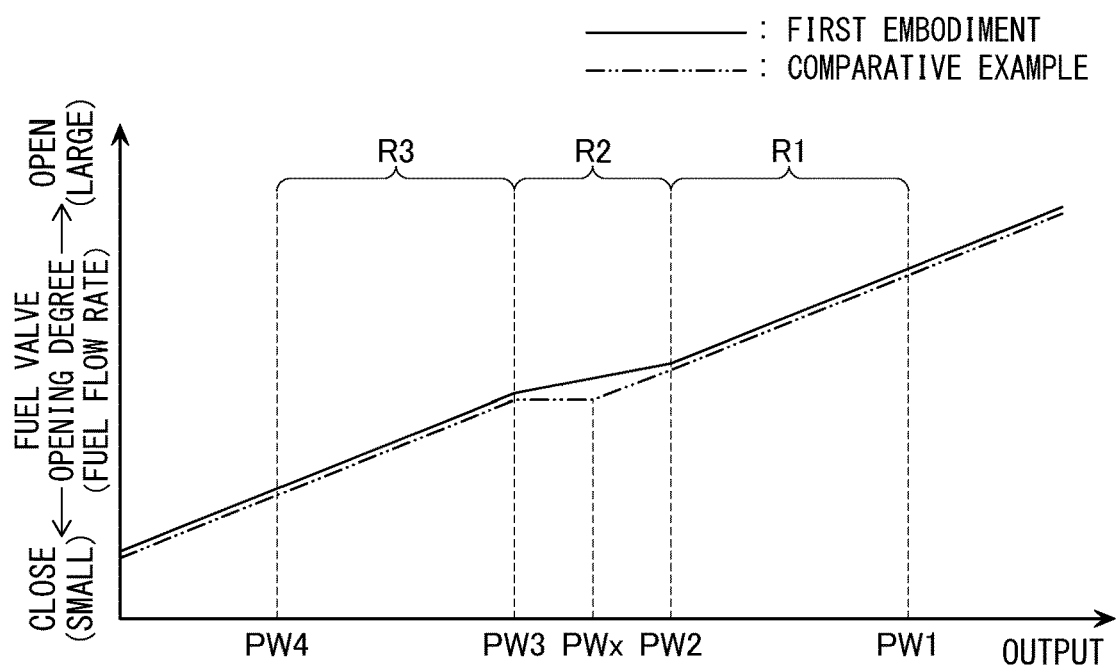
FIG. 8 is a graph showing a relationship between the output of the gas turbine and a fuel valve opening degree (or a fuel flow rate) in the first embodiment according to the present disclosure.

Also, in the comparative example, as indicated by the dashed double-dotted line in the graph of FIG. 8, it is assumed that the opening degree of the fuel valve 8v changes with a change in the target output PWt. Specifically, when the target output PWt is between the rated output and the output PWx, the opening degree of the fuel valve 8v gradually decreases with the decrease in the target output PWt, in other words, the fuel flow rate gradually decreases with the decrease in the target output PWt. Also, it is assumed that when the target output PWt is between the output PWx and the third output PW3, the opening degree of the fuel valve 8v does not change, in other words, the fuel flow rate does not change. Also, it is assumed that when the target output PWt is less than or equal to the third output PW3, the opening degree of the fuel valve 8v gradually decreases with the decrease in the target output PWt, in other words, the fuel flow rate gradually decreases with the decrease in the target output PWt.

As described above, in the comparative example, when the output of the gas turbine is decreased as in the technology described in Patent Document 1, first, the fuel flow rate is gradually reduced and the IGV 17 is closed to gradually decrease the suction amount. Subsequently, when the suction amount becomes somewhat small, the bypass valve 9V is gradually opened. In the process of gradually opening the bypass valve 9v, the IGV 17 is allowed to perform an opening operation to gradually increase the suction amount. In the process of gradually opening the bypass valve 9V, the fuel flow rate does not change. When the bypass valve 9v is fully opened, the fuel flow rate gradually decreases again and the suction amount gradually decreases again by causing the IGV 17 to perform the closing operation.

In the comparative example, when the fuel valve 8v, the IGV 17, and the bypass valve 9v are controlled as described above, as shown in FIG. 9, the exhaust gas temperature is maintained at the allowable maximum temperature between the rated output and the fourth output PW4.

In the comparative example, when the fuel valve 8v, the IGV 17, and the bypass valve 9v are controlled as described above, the turbine inlet temperature changes as indicated by the dashed double-dotted line in the graph of FIG. 10 as shown in FIG. 10. Specifically, in the comparative example, the turbine inlet temperature also basically gradually decreases with the decrease in the actual output of the turbine 30. In this regard, when the actual output is within the range from the output PWx to the third output PW3, the temperature change ratio, which is a ratio of the decrease in turbine inlet temperature due to the decrease in the actual output, is lower than a temperature change ratio when the actual output is within the first output range R1 and within the third output range R3.

In the comparative example, the value of the third output PW3 and the value of the IGV opening degree (the opening/closing angle of the vane 17v) when the actual output is the third output PW3 are also determined on the basis of the above-described third output conditions. Consequently, the value of the third output PW3 corresponds to the value of the third output PW3 in the present embodiment. Also, the IGV opening degree value when the actual output is the third output PW3 corresponds to the IGV opening degree value when the actual output is the third output PW3 in the present embodiment.

Also, in the comparative example, the value of the output PWx and the value of the IGV opening degree when the actual output is the output PWx are determined on the basis of the above-described second output conditions. When the condition a of the second output conditions is applied to the comparative example, the condition a is that a change trend of the IGV opening degree when the actual output is in a range from the third output PW3 to the output PWx is a predetermined change trend and a change trend using a point P3 as a based point. Also, the point P3 is an operating point whose actual output is the third output PW3 and which indicates the IGV opening degree at that time. In the comparative example, the IGV opening degree whose actual output is within the range from the third output PW3 to the output PWx gradually increases with the decrease in the actual output. Thus, on the basis of the point P3, the IGV opening degree gradually decreases with the increase in the actual output. i.e., the actual output increases and the IGV 17 is gradually closed to decrease the suction amount. Consequently, in the comparative example, the change trend of the IGV opening degree when the actual output is within the range from the third output PW3 to the output PWx is a steadily increasing change trend based on the point P3 in the graph of FIG. 6.

When conditions b and c among the second output conditions are added to this condition a and the value of the output PWx in the comparison example is determined, the value of the output PWx becomes a value between the second output PW2 and the third output PW3. Also, when the IGV opening degree value when the actual output is the output PWx is determined in the comparative example, the value of the IGV opening degree at this time is smaller than the IGV opening degree value when the actual output is the second output PW2 in the present embodiment.

As described above, when the bypass valve 9V is closed, the turbine inlet temperature gradually decreases with the decrease in the actual output. In other words, the turbine inlet temperature gradually decreases with the decrease in the actual power until the bypass valve 9v begins to open. The actual output when the bypass valve 9v starts to open in the present embodiment is a second output PW2 greater than an actual output Pwx when the bypass valve 9v starts to open in the comparative example. Thus, the turbine inlet temperature at which the bypass valve 9v starts to open in the present embodiment is higher than the turbine inlet temperature when the bypass valve 9v starts to open in the comparative example. Also, the operating point when the bypass valve 9v is fully opened in the comparative example is the point P3 identical to the operating point when the bypass valve 9v is fully opened in the present embodiment. Thus, the turbine inlet temperature when the bypass valve 9v is fully opened in the comparative example is the same as the turbine inlet temperature when the bypass valve 9v is fully opened in the present embodiment.

Consequently, when the actual output is in the range from the second output PW2 to the third output PW3, the turbine inlet temperature is higher in the present embodiment than in the comparative example.

As described above, in the present embodiment, as in the comparative example, in the process of decreasing the output of the gas turbine, the fuel flow rate gradually decreases and the flow rate of the compressed air CA flowing into the combustor 20 gradually decreases in combination with the IGV 17 and the bypass valve 9v and therefore it is possible to decrease the output of the gas turbine while stably operating the gas turbine.

In the comparative example, in the process of decreasing the output of the gas turbine, the IGV 17 is allowed to perform a closing operation, perform an opening operation, and then perform the closing operation again. On the other hand, in the present embodiment, in the process of decreasing the output of the gas turbine, the IGV 17 is allowed to perform the closing operation without performing the opening operation. Thus, in the present embodiment, the operation of the IGV 17 is less complicated than in the comparative example and the decrease in durability of the IGV 17 can be suppressed.

Also, in the present embodiment, because the turbine inlet temperature is higher than in the comparative example when the actual output is in the range from the second output PW2 to the third output PW3, the exhaust amount of an unburned component such as carbon monoxide can be reduced within this range.

"Second Embodiment of Gas Turbine Facility"

Figure 11:
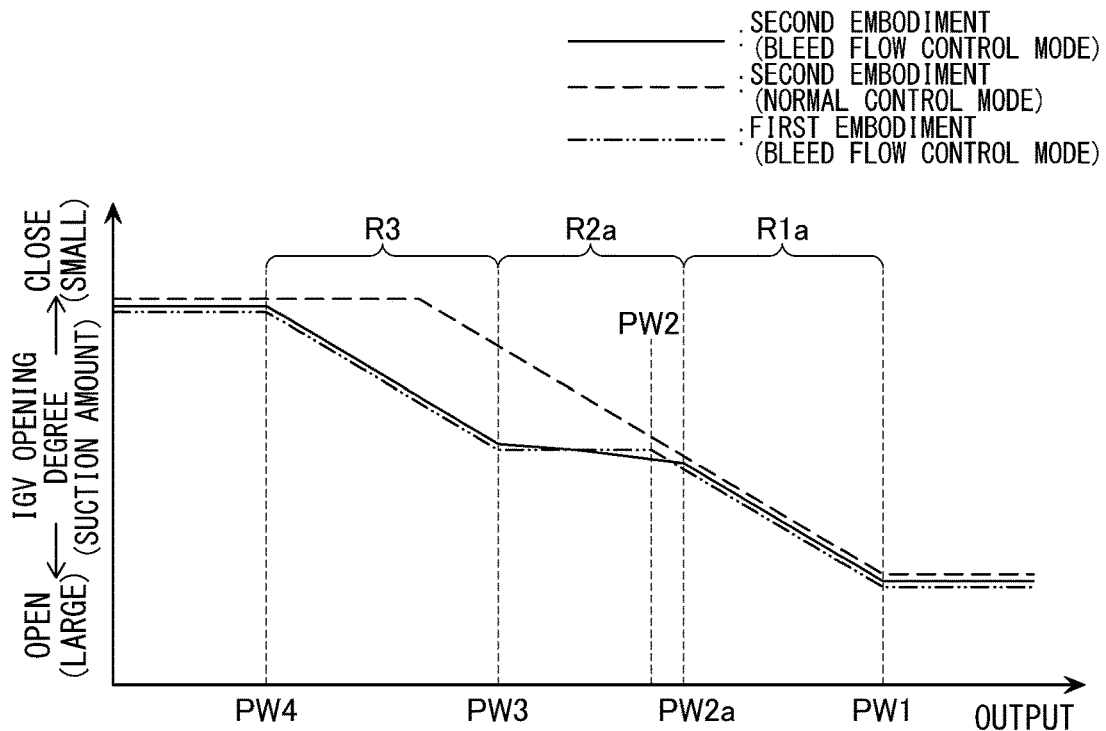
FIG. 11 is a graph showing a relationship between an output of a gas turbine and an IGV opening degree (or a suction amount) in a second embodiment according to the present disclosure.

Hereinafter, a second embodiment of a gas turbine facility will be described with reference to FIGS. 11 to 13.

In the first embodiment, at the time of the bleed flow control mode, the IGV opening degree θ is maintained constant with respect to the change within the second output range R2. On the other hand, in the present embodiment, at the time of the bleed flow control mode, as shown in FIG. 11, the IGV opening degree θ gradually decreases with the decrease in the actual output within the second output range R2, i.e., the IGV 17 is gradually closed to decrease the suction amount. The gas turbine facility in the present embodiment is different from the gas turbine facility in the first embodiment in that respect and others are the same therebetween. Thus, the hardware configuration of the gas turbine facility in the present embodiment is the same as the hardware configuration of the gas turbine facility in the first embodiment shown in FIGS. 1 and 2.

In the present embodiment, as described above, within the second output range R2, the IGV opening degree θ gradually decreases with the decrease in the actual output. Thus, if the value of the second output PW2a in the present embodiment and the value of the IGV opening degree (the opening/closing angle of the vane 17v) when the actual output is the second output PW2a are determined under the above-described second output conditions, the value of the second output PW2a in the present embodiment is larger than the value of the second output PW2 in the first embodiment.

As described above, because the second output, which is the output at the boundary between the first output range R1 and the second output range R2, changes in the present embodiment with respect to the first embodiment, the first output range R1a in the present embodiment is different from the first output range R1 in the first embodiment and the second output range R2a in the present embodiment is different from the second output range R2 in the first embodiment.

Figure 12:
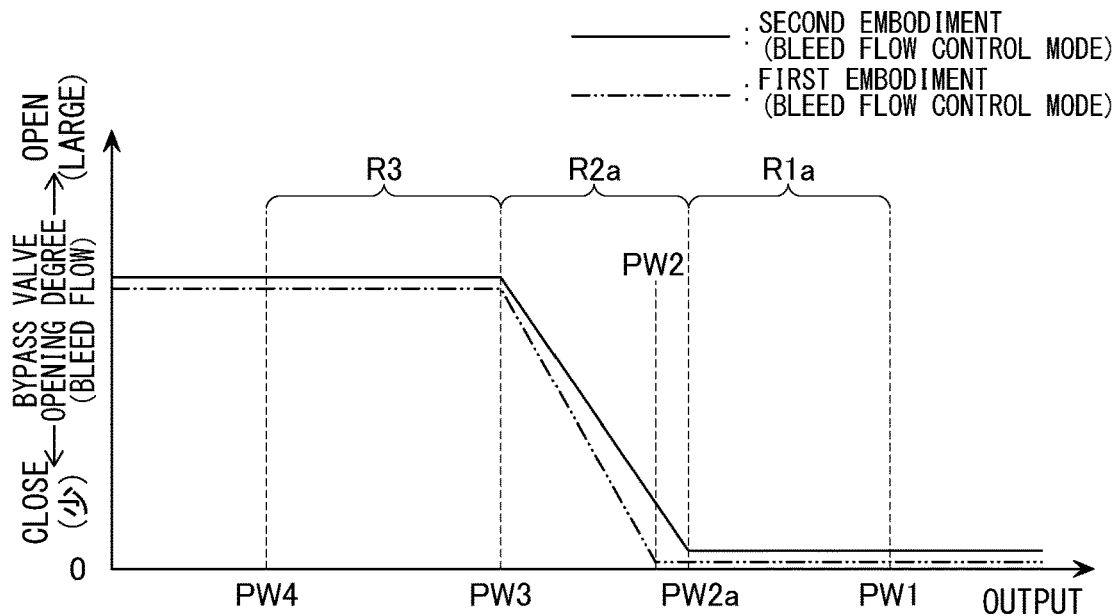
FIG. 12 is a graph showing a relationship between the output of the gas turbine and a bypass valve opening degree (or a bleed flow) in the second embodiment according to the present disclosure.
Figure 13:
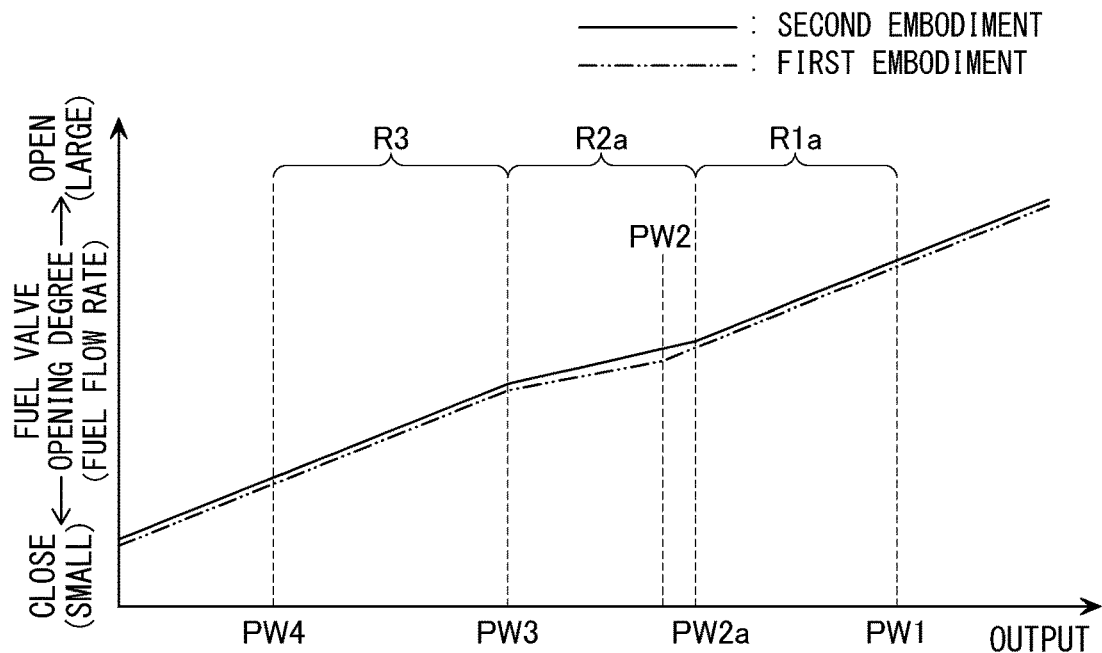
FIG. 13 is a graph showing a relationship between the output of the gas turbine and a fuel valve opening degree (or a fuel flow rate) in the second embodiment according to the present disclosure.

In the present embodiment, at the time of the bleed flow control mode, as shown in FIG. 12, when the actual output becomes the second output PW2a, as in the first embodiment, the bypass valve 9v begins to open. As in the first embodiment, a control step is performed so that the opening degree of the bypass valve 9v increases with the decrease in the actual output within the second output range R2a.

Also, in the present embodiment, as in the first embodiment, the fuel controller 110 determines the fuel flow rate in accordance with the difference between the target output PWt and the actual output PWr, regardless of the type of control mode and the range of the actual output of the gas turbine and the valve opening degree corresponding to the fuel flow rate is indicated to the fuel valve 8v. Also, the flow rate change ratio, which is the ratio of the fuel flow rate change to the actual output change when the actual output of the gas turbine is within the second output range R2a, is also lower than that when the actual output of the gas turbine is within the first output range R1a and within the third output range R3 as indicated by the solid line in FIG. 13 as in the first embodiment.

As described above, in the present embodiment, as in the first embodiment, in the process of decreasing the output of the gas turbine, the fuel flow rate is gradually decreased and the flow rate of the compressed air CA flowing into the combustor 20 is gradually decreased in combination with the IGV 17 and the bypass valve 9v and therefore it is possible to decrease the output of the gas turbine while stably operating the gas turbine.

Also, in the present embodiment, as in the first embodiment, in the process of decreasing the output of the gas turbine, the IGV 17 is allowed to perform the closing operation without performing the opening operation and therefore the decrease in durability of the IGV 17 can be suppressed.

Also, in the present embodiment, as in the first embodiment, because the turbine inlet temperature is higher than in the comparative example when the actual output is in the range from the second output PW2a to the third output PW3, the exhaust amount of an unburned component such as carbon monoxide can be reduced within this range.

"Modified Example"

In each of the above embodiments, when the actual output of the gas turbine is within a range of an output less than the third output PW3, the bypass valve 9v is maintained in a fully opened state to keep the carbon monoxide concentration low. However, for example, after the actual output of the gas turbine becomes the third output PW3, the bypass valve 9v may be maintained in the fully opened state for a while, and then the bypass valve 9v may be closed. Also, for example, if the actual output of the gas turbine is in a range of an output less than the third output PW3, the bypass valve 9v may be closed in the entire range. Thus, when the bypass valve 9V is closed, the gas turbine efficiency is improved within this range.

Also, the present disclosure is not limited to each embodiment and modified example described above. Various additions, changes, replacements, partial deletions, and the like are possible without departing from the conceptual spirit and scope of the present invention derived from content defined in the claims and their equivalents.

"Appendix"

A control method for a gas turbine according to the above embodiment is ascertained as follows as an example.

(1) According to a first aspect, a method of controlling a gas turbine is applied to the following gas turbine.

This gas turbine includes a compressor 10 configured to compress air A to generate the compressed air CA, a combustor 20 configured to burn fuel F in the compressed air CA to generate combustion gas G, and a turbine 30 driven by the combustion gas G.

This method of controlling the gas turbine includes a fuel control step S30 of controlling a fuel flow rate so that the fuel flow rate of the fuel F supplied to the combustor 20 becomes a flow rate corresponding to a target output PWt for the gas turbine; a suction amount control step S10 of controlling a suction amount so that the suction amount, which is a flow rate of the air A suctioned by the compressor 10, becomes a flow rate corresponding to an actual output PWr of the gas turbine; and a bleed flow control step S20 of controlling a bleed flow so that the bleed flow, which is a flow rate for externally exhausting a part of the compressed air CA from the compressor 10 without involving the combustor 20, becomes a flow rate corresponding to the actual output The fuel flow rate is controlled so that the fuel flow rate gradually decreases as the target output PWt decreases in the fuel control step S30. The suction amount control step S10 includes a first suction amount control step S17 and a second suction amount control step S18. The bleed flow control step S20 includes a first bleed flow control step S27 and a second bleed flow control step S28. When the actual output is in a first output range R1 from a first output PW1 less than or equal to a rated output of the gas turbine to a second output PW2 that is an output less than the first output PW1, the suction amount is controlled so that the suction amount gradually decreases as the actual output PWr decreases in the first suction amount control step S17, and the bleed flow is controlled so that the bleed flow is maintained at 0 in the first bleed flow control step S27. When the actual output is in a second output range R2 from the second output PW2 to a third output PW3 that is an output less than the second output PW2, the suction amount is controlled so that the suction amount gradually decreases as the actual output PWr decreases or the suction amount becomes constant even if the actual output PWr decreases in the second suction amount control step S18 and the bleed flow is controlled so that the bleed flow gradually increases as the actual output PWr decreases and the bleed flow becomes maximum when the actual output PWr of the gas turbine becomes the third output PW3 in the second bleed flow control step S28.

In the present aspect, in the process of reducing the output of the gas turbine, the fuel flow rate is gradually reduced and both the suction amount and the bleed flow are controlled, the flow rate of compressed air CA flowing into the combustor 20 is gradually reduced and therefore it is possible to decrease the output of the gas turbine while stably operating the gas turbine.

In the present aspect, in the process of reducing the output of the gas turbine, the suction amount is decreased, but the suction amount is not increased. That is, in the present aspect, in the process of reducing the output of the gas turbine, the suction amount adjuster 17 capable of adjusting the suction amount is allowed to perform a closing operation without performing an opening operation. Thus, in the present aspect, a decrease in the durability of the suction amount adjuster 17 can be suppressed.

In the present aspect, because the turbine inlet temperature increases when the actual output is in the range from the second output PW2 to the third output PW3, the exhaust amount of an unburned component such as carbon monoxide can be reduced within this range.

(2) According to a second aspect, in the method of controlling the gas turbine according to the first aspect, the suction amount control step S10 includes a third suction amount control step S19. The bleed flow control step S20 includes a third bleed flow control step S29. When the actual output is in a third output range R3 from the third output PW3 to a fourth output PW4 that is an output less than the third output PW3, the suction amount is controlled so that the suction amount gradually decreases as the actual output PWr decreases and the suction amount becomes minimum when the actual output PWr of the gas turbine becomes the fourth output PW4 in the third suction amount control step S19 and the bleed flow is controlled so that the ratio of the bleed flow to the suction amount is maintained at a maximum in the third bleed flow control step S29.

(3) According to a third aspect, in the method of controlling the gas turbine according to the first or second aspect, the third output PW3 and a third suction amount, which is a suction amount when the actual output PWr is the third output PW3, are values determined under a third output condition. The third output condition is that the bleed flow is a maximum, an exhaust gas temperature, which is a temperature of the combustion gas G immediately after an exhaust process of the turbine 30, is an allowable maximum temperature, and the temperature of the combustion gas G flowing into the turbine 30 is a temperature when a concentration of an unburned component included in the combustion gas G becomes an allowable maximum concentration.

(4) According to a fourth aspect, in the method of controlling the gas turbine according to the third aspect, the second output PW2 and a fourth suction amount, which is a suction amount when the actual output PWr is the second output PW2, are values determined under a second output condition. The second output condition is that a trend of a change in the suction amount within the second output range R2 is a predetermined change trend based on the third suction amount, the bleed flow is 0, and the exhaust gas temperature, which is the temperature of the combustion gas G immediately after the exhaust process of the turbine 30, is the allowable maximum temperature.

(5) According to a fifth aspect, in the method of controlling the gas turbine according to any one of the first to fourth aspects, the suction amount is controlled so that the suction amount gradually decreases as the actual output PWr decreases in the second suction amount control step S18.

(6) According to a sixth aspect, in the method of controlling the gas turbine according to any one of the first to fourth aspects, the suction amount is controlled so that the suction amount becomes constant even if the actual output PWr decreases in the second suction amount control step S18.

(7) According to a seventh aspect, in the method of controlling the gas turbine according to any one of the first to sixth aspects, a mode is performed when an instruction for executing one of a bleed flow control mode and a normal control mode is received in each of the suction amount control step S10 and the bleed flow control step S20. In the bleed flow control mode, the first suction amount control step S17 and the first bleed flow control step S27 are performed in the first output range R1, and the second suction amount control step S18 and the second bleed flow control step S28 are performed in the second output range R2. In the normal control mode, even if the output of the gas turbine is in one of the first output range R1 and the second output range R2 in the normal control mode, a normal suction amount control step S13 of controlling the suction amount is performed so that the suction amount gradually decreases as the actual output PWr decreases in the suction amount control step S10, and a normal bleed flow control step S23 of controlling the bleed flow is performed so that the bleed flow is maintained at 0 in the bleed flow control step S20.

A non-transitory computer-readable storage medium storing a control program for a gas turbine according to the above embodiment is ascertained as follows as an example.

(8) According to an eighth aspect, a non-transitory computer-readable storage medium storing a control program for a gas turbine is applied to control the following gas turbine.

This gas turbine includes a compressor 10 configured to compress air A to generate the compressed air CA, a combustor 20 configured to burn fuel F in the compressed air CA to generate combustion gas G, a turbine 30 driven by the combustion gas G, a fuel line 8 connected to the combustor 20 so that the fuel is able to be supplied to the combustor 20, a fuel valve 8v provided on the fuel line 8 and configured to adjust a fuel flow rate that is a flow rate of the fuel F flowing into the fuel line 8, a bypass line 9 configured to externally exhaust a part of the compressed air CA from the compressor 10 without involving the combustor 20, and a bypass valve 9v provided on the bypass line and configured to adjust a bleed flow that is a flow rate of the compressed air CA flowing through the bypass line 9. The compressor 10 includes a suction amount adjuster 17 having a vane 17v capable of being opened and closed so that the suction amount that is a flow rate of air A suctioned by the compressor 10 is able to be adjusted.

The control program 104p for the gas turbine includes a fuel control step S30 of determining the fuel flow rate in accordance with a target output PWt for the gas turbine and indicating a valve opening degree to the fuel valve 8v so that the determined fuel flow rate is reached; a suction amount control step S10 of determining opening and closing angles of the vane 17v in accordance with the actual output PWr of the gas turbine and issuing an instruction to the suction amount adjuster 17 so that the determined opening and closing angles of the vane 17v are reached; and a bleed flow control step S20 of determining a valve opening degree of the bypass valve 9v in accordance with the actual output PWr and issuing an instruction to the bypass valve 9v so that the determined valve opening degree is reached. The fuel flow rate is determined so that the fuel flow rate gradually decreases as the target output PWt decreases and the valve opening degree is indicated to the fuel valve 8v so that the determined fuel flow rate is reached in the fuel control step S30. The suction amount control step S10 includes a first suction amount control step S17 and a second suction amount control step S18. The bleed flow control step S20 includes a first bleed flow control step S27 and a second bleed flow control step S28. When the actual output PWr is in a first output range R1 from a first output PW1 less than or equal to a rated output of the gas turbine to a second output PW2 that is an output less than the first output PW1, the opening and closing angles of the vane 17v are determined so that the suction amount gradually decreases as the actual output PWr decreases and the opening and closing angles of the vane 17v are indicated to the suction amount adjuster 17 in the first suction amount control step S17 and an instruction is issued to the bypass valve 9v so that the bypass valve 9v is closed in the first bleed flow control step S27. When the actual output PWr is in a second output range R2 from the second output PW2 to a third output PW3 that is an output less than the second output PW2, the opening and closing angles of the vane 17v are determined so that the suction amount gradually decreases as the actual output PWr decreases or the suction amount becomes constant even if the actual output PWr decreases and the opening and closing angles of the vane 17v are indicated to the suction amount adjuster 17 in the second suction amount control step S18 and an instruction is issued to the bypass valve 9v so that the bleed flow gradually increases as the actual output PWr decreases and the bypass valve 9v is fully opened when the actual output PWr of the gas turbine becomes the third output PW3 in the second bleed flow control step S28.

The storage medium is a non-transitory computer-readable storage medium storing the above control program 104p.

By causing the computer to execute the control program of the present aspect, as in the control method according to the first aspect, it is possible to reduce the output of the gas turbine while stably operating the gas turbine, suppress the decrease in the durability of the suction amount adjuster 17, and reduce the exhaust amount of the unburned component.

A control device for a gas turbine according to the above embodiment is ascertained as follows as an example.

(9) According to a ninth aspect, a control device for a gas turbine is applied to the following gas turbine.

The gas turbine includes a compressor 10 configured to compress air A to generate the compressed air CA, a combustor 20 configured to burn fuel F in the compressed air CA to generate combustion gas G, a turbine 30 driven by the combustion gas G, a fuel line 8 connected to the combustor 20 so that the fuel F is able to be supplied to the combustor 20, a fuel valve 8v provided on the fuel line 8 and configured to adjust a fuel flow rate that is a flow rate of the fuel flowing through the fuel line 8, a bypass line 9 configured to externally exhaust a part of the compressed air CA from the compressor 10 without involving the combustor 20, and a bypass valve 9v provided on the bypass line 9 and configured to adjust a bleed flow that is a flow rate of the compressed air CA flowing into the bypass line. The compressor 10 includes a suction amount adjuster 17 having a vane 17v capable of being opened and closed so that the suction amount that is a flow rate of air A suctioned by the compressor 10 is able to be adjusted.

The control device 100 for the gas turbine includes a fuel controller 110 configured to determine the fuel flow rate in accordance with a target output PWt for the gas turbine and indicate a valve opening degree to the fuel valve 8v so that the determined fuel flow rate is reached; a suction amount controller 120 configured to determine opening and closing angles of the vane 17v in accordance with the actual output PWr of the gas turbine and issue an instruction to the suction amount adjuster 17 so that the determined opening and closing angles of the vane 17v are reached; and a bleed flow controller 130 configured to determine a valve opening degree of the bypass valve 9v in accordance with the actual output PWr and issue an instruction to the bypass valve 9v so that the determined valve opening degree is reached. The fuel controller 110 determines the fuel flow rate so that the fuel flow rate gradually decreases as the target output PWt decreases and the valve opening degree is indicated to the fuel valve 8v so that the determined fuel flow rate is reached. The suction amount controller 120 is able to perform a first suction amount control step S17 and a second suction amount control step S18. The bleed flow controller 130 is able to perform a first bleed flow control step S27 and a second bleed flow control step S28. When the actual output PWr is in a first output range R1 from a first output PW1 less than or equal to a rated output of the gas turbine to a second output PW2 that is an output less than the first output PW1, the suction amount controller 120 determines the opening and closing angles of the vane 17v so that the suction amount gradually decreases as the target output PWt decreases and the opening and closing angles of the vane 17v are indicated to the suction amount adjuster 17 in the first suction amount control step S17, and the bleed flow controller 130 issues an instruction to the bypass valve 9v so that the bypass valve 9v is closed in the first bleed flow control step S27. When the actual output PWr is in a second output range R2 from the second output PW2 to a third output PW3 that is an output less than the second output PW2, the suction amount controller 120 determines the opening and closing angles of the vane 17v so that the suction amount gradually decreases as the actual output PWr decreases or the suction amount becomes constant even if the actual output PWr decreases and the opening and closing angles of the vane 17v are indicated to the suction amount adjuster 17 in the second suction amount control step S18, and the bleed flow controller 130 issues an instruction to the bypass valve 9v so that the bleed flow gradually increases as the actual output PWr decreases and the bypass valve 9v is fully opened when the actual output PWr of the gas turbine becomes the third output PW3 in the second bleed flow control step S28.

In the present aspect, as in the control method in the first aspect, it is possible to reduce the output of the gas turbine while stably operating the gas turbine, suppress the decrease in the durability of the suction amount adjuster 17, and reduce the exhaust amount of the unburned component.

(10) According to a tenth aspect, in the control device for the gas turbine according to the ninth aspect, the suction amount controller 120 is able to perform a third suction amount control step S19. The bleed flow controller 130 is able to perform a third bleed flow control step S29. When the actual output PWr is in a third output range R3 from the third output PW3 to a fourth output PW4 that is an output less than the third output PW3, the suction amount controller 120 indicates the opening and closing angles of the vane 17v to the suction amount adjuster 17 so that the suction amount gradually decreases as the actual output PWr decreases and the suction amount becomes minimum when the actual output PWr of the gas turbine becomes the fourth output PW4 in the third suction amount control step S19 and the bleed flow controller 130 issues an instruction to the bypass valve 9v so that the bypass valve 9v is fully opened in the third bleed flow control step S29.

(11) According to an eleventh aspect, in the control device 100 for the gas turbine according to the ninth or tenth aspect, the third output PW3 and third opening and closing angles, which are the opening and closing angles of the vane 17v when the actual output PWr is the third output PW3, are values determined under a third output condition. The third output condition is that the bypass valve 9v is fully opened, an exhaust gas temperature, which is a temperature of the combustion gas G immediately after an exhaust process of the turbine 30, is an allowable maximum temperature, and the temperature of the combustion gas G flowing into the turbine 30 is a temperature when a concentration of an unburned component included in the combustion gas G becomes an allowable maximum concentration.

(12) According to a twelfth aspect, in the control device 100 for the gas turbine according to the eleventh aspect, the second output PW2 and second opening and closing angles, which are the opening and closing angles of the vane 17v when the actual output PWr is the second output PW2, are values determined under a second output condition. The second output condition is that a trend of a change in the opening and closing angles of the vane 17v within the second output range R2 is a predetermined change trend based on the third opening and closing angles, the bypass valve 9v is closed, and the exhaust gas temperature, which is the temperature of the combustion gas G immediately after the exhaust process of the turbine 30, is an allowable maximum temperature.

(13) According to a thirteenth aspect, in the control device 100 for the gas turbine according to any one of the ninth to twelfth aspects, the suction amount controller 120 determines the opening and closing angles of the vane 17v so that the suction amount gradually decreases as the actual output PWr decreases in the second suction amount control step S18 and indicates the opening and closing angles of the vane 17v to the suction amount adjuster 17.

(14) According to a fourteenth aspect, in the control device 100 for the gas turbine according to any one of the ninth to twelfth aspects, the suction amount controller 120 determines the opening and closing angles of the vane 17v so that the suction amount becomes constant even if the actual output PWr decreases in the second suction amount control step S18 and indicates the opening and closing angles of the vane 17v to the suction amount adjuster 17.

(15) According to a fifteenth aspect, in the control device 100 for the gas turbine according to any one of the ninth to fourteenth aspects, each of the suction amount controller 120 and the bleed flow controller 130 performs a mode when an instruction for executing one of a bleed flow control mode and a normal control mode is received. In the bleed flow control mode, the suction amount controller performs the first suction amount control step S17 and the bleed flow controller 130 performs the first bleed flow control step S27 in the first output range R1, and the suction amount controller performs the second suction amount control step S18 and the bleed flow controller 130 performs the second bleed flow control step S28 in the second output range R2. In the normal control mode, even if the output of the gas turbine is in one of the first output range R1 and the second output range R2 in the normal control mode, the suction amount controller 120 performs a normal suction amount control step S13 of determining the opening and closing angles of the vane 17v so that the suction amount gradually decreases as the actual output PWr decreases and indicating the opening and closing angles of the vane 17*v* to the suction amount adjuster 17, and the bleed flow controller 130 performs a normal bleed flow control step S23 of issuing an instruction to the bypass valve 9*v* so that the bypass valve 9*v* is closed.

A gas turbine facility according to the above embodiment is ascertained as follows as an example.

(16) According to a sixteenth aspect, there is provided a gas turbine facility including: the control device 100 for the gas turbine according to any one of the ninth to fifteenth aspects; and the gas turbine.

EXPLANATION OF REFERENCES

1 Gas turbine body
2 Gas turbine rotor
5 Intermediate casing
6 Gas turbine casing
8 Fuel line
8*v* Fuel valve
9 Bypass line
9*v* Bypass valve
10 Compressor
12 Compressor rotor
13 Rotor shaft
14 Blade array
15 Vane array
16 Compressor casing
17 Bleed flow adjuster (IGV)
17*v* Vane
17*d* Drive
20 Combustor
30 Turbine
32 Turbine rotor
33 Rotor shaft
34 Blade array
35 Vane array
36 Turbine casing
40 Exhaust casing
50 Power generator
51 Power meter
100 Control device
101 Computer body
102 CPU
103 Main storage device
104 Auxiliary storage device
104*p* Control program
105*a* Input/output interface
105*b* Device interface
105*c* Communication interface
105*d* Storage and playback device
106 Input device
107 Display device
110 Fuel controller
111 Difference calculator
112 Proportional Integrator
119 Control signal generator
120 Suction amount controller
121 First IGV opening degree generator
125 Second IGV opening degree generator
129 Control signal generator
130 Bleed flow controller
131 First bypass valve opening degree generator
135 Second bypass valve opening degree generator
139 Control signal generator A Air
CA Compressed air
F Fuel
EG Exhaust gas
Ar Axis
Da Axial direction
Dau Upstream axial side
Dad Downstream axial side
Dc Circumferential direction
Dr Radial direction

What is claimed is:

1. A method of controlling a gas turbine including a compressor configured to compress air to generate the compressed air, a combustor configured to burn fuel in the compressed air to generate combustion gas, and a turbine driven by the combustion gas, the method of controlling the gas turbine comprising:
    a fuel control step of controlling a fuel flow rate so that the fuel flow rate of the fuel supplied to the combustor becomes a flow rate corresponding to a target output for the gas turbine;
    a suction amount control step of controlling a suction amount so that the suction amount, which is a flow rate of the air suctioned by the compressor, becomes a flow rate corresponding to an actual output of the gas turbine; and
    a bleed flow control step of controlling a bleed flow so that the bleed flow, which is a flow rate for externally exhausting a part of the compressed air from the compressor without involving the combustor, becomes a flow rate corresponding to the actual output,
    wherein the fuel flow rate is controlled so that the fuel flow rate gradually decreases as the target output decreases in the fuel control step,
    wherein the suction amount control step includes a first suction amount control step and a second suction amount control step,
    wherein the bleed flow control step includes a first bleed flow control step and a second bleed flow control step,
    wherein, when the actual output is in a first output range from a first output less than or equal to a rated output of the gas turbine to a second output that is an output less than the first output,
    the suction amount is controlled so that the suction amount gradually decreases as the actual output decreases in the first suction amount control step, and
    the bleed flow is controlled so that the bleed flow is maintained at 0 in the first bleed flow control step, and
    wherein, when the actual output is in a second output range from the second output to a third output that is an output less than the second output,
    the suction amount is controlled so that the suction amount gradually decreases as the actual output decreases or the suction amount becomes constant even if the actual output decreases in the second suction amount control step, and
    the bleed flow is controlled so that the bleed flow gradually increases as the actual output decreases and a ratio of the bleed flow to the suction amount becomes maximum when the actual output of the gas turbine becomes the third output in the second bleed flow control step.

2. The method of controlling the gas turbine according to claim 1,
    wherein the suction amount control step includes a third suction amount control step, wherein the bleed flow control step includes a third bleed flow control step, and wherein, when the actual output is in a third output range from the third output to a fourth output that is an output less than the third output, the suction amount is controlled so that the suction amount gradually decreases as the actual output decreases and the suction amount becomes minimum when the actual output of the gas turbine becomes the fourth output in the third suction amount control step, and the bleed flow is controlled so that the ratio of the bleed flow to the suction amount is maintained at a maximum in the third bleed flow control step.

3. The method of controlling the gas turbine according to claim 1, wherein the third output and a third suction amount, which is a suction amount when the actual output is the third output, are values determined under a third output condition, and wherein the third output condition is that the bleed flow is a maximum, an exhaust gas temperature, which is a temperature of the combustion gas immediately after an exhaust process of the turbine, is an allowable maximum temperature, and the temperature of the combustion gas flowing into the turbine is a temperature when a concentration of an unburned component included in the combustion gas becomes an allowable maximum concentration.

4. The method of controlling the gas turbine according to claim 3, wherein the second output and a fourth suction amount, which is a suction amount when the actual output is the second output, are values determined under a second output condition, and wherein the second output condition is that a trend of a change in the suction amount within the second output range is a predetermined change trend based on the third suction amount, the bleed flow is 0, and the exhaust gas temperature, which is the temperature of the combustion gas immediately after the exhaust process of the turbine, is the allowable maximum temperature.

5. The method of controlling the gas turbine according to claim 1, wherein the suction amount is controlled so that the suction amount gradually decreases as the actual output decreases in the second suction amount control step.

6. The method of controlling the gas turbine according to claim 1, wherein the suction amount is controlled so that the suction amount becomes constant even if the actual output decreases in the second suction amount control step.

7. The method of controlling the gas turbine according to claim 1, wherein a mode is performed when an instruction for executing one of a bleed flow control mode and a normal control mode is received in each of the suction amount control step and the bleed flow control step, wherein, in the bleed flow control mode, the first suction amount control step and the first bleed flow control step are performed in the first output range, and the second suction amount control step and the second bleed flow control step are performed in the second output range, and wherein, in the normal control mode, even if the output of the gas turbine is in one of the first output range and the second output range in the normal control mode, a normal suction amount control step of controlling the suction amount is performed so that the suction amount gradually decreases as the actual output decreases in the suction amount control step, and a normal bleed flow control step of controlling the bleed flow is performed so that the bleed flow is maintained at 0 in the bleed flow control step.

8. A non-transitory computer-readable storage medium storing a control program for a gas turbine including a compressor configured to compress air to generate the compressed air, a combustor configured to burn fuel in the compressed air to generate combustion gas, a turbine driven by the combustion gas, a fuel line connected to the combustor so that the fuel is able to be supplied to the combustor, a fuel valve provided on the fuel line and configured to adjust a fuel flow rate that is a flow rate of the fuel flowing through the fuel line, a bypass line configured to externally exhaust a part of the compressed air from the compressor without involving the combustor, and a bypass valve provided on the bypass line and configured to adjust a bleed flow that is a flow rate of the compressed air flowing through the bypass line, wherein the compressor includes a suction amount adjuster having a vane capable of being opened and closed so that the suction amount that is a flow rate of air suctioned by the compressor is able to be adjusted, the control program causing a computer to perform:

a fuel control step of determining the fuel flow rate in accordance with a target output for the gas turbine and indicating a valve opening degree to the fuel valve so that the determined fuel flow rate is reached;

a suction amount control step of determining opening and closing angles of the vane in accordance with the actual output of the gas turbine and issuing an instruction to the suction amount adjuster so that the determined opening and closing angles of the vane are reached; and a bleed flow control step of determining a valve opening degree of the bypass valve in accordance with the actual output and issuing an instruction to the bypass valve so that the determined valve opening degree is reached, wherein the fuel flow rate is determined so that the fuel flow rate gradually decreases as the target output decreases and the valve opening degree is indicated to the fuel valve so that the determined fuel flow rate is reached in the fuel control step, wherein the suction amount control step includes a first suction amount control step and a second suction amount control step, wherein the bleed flow control step includes a first bleed flow control step and a second bleed flow control step, wherein, when the actual output is in a first output range from a first output less than or equal to a rated output of the gas turbine to a second output that is an output less than the first output, the opening and closing angles of the vane are determined so that the suction amount gradually decreases as the actual output decreases and the opening and closing angles of the vane are indicated to the suction amount adjuster in the first suction amount control step, and an instruction is issued to the bypass valve so that the bypass valve is closed in the first bleed flow control step, and wherein, when the actual output is in a second output range from the second output to a third output that is an output less than the second output, the opening and closing angles of the vane are determined so that the suction amount gradually decreases as the actual output decreases or the suction amount becomes constant even if the actual output decreases and the opening and closing angles of the vane are indicated to the suction amount adjuster in the second suction amount control step, and an instruction is issued to the bypass valve so that the bleed flow gradually increases as the actual output decreases and the bypass valve is fully opened when the actual output of the gas turbine becomes the third output in the second bleed flow control step.

9. A control device for a gas turbine including a compressor configured to compress air to generate the compressed air, a combustor configured to burn fuel in the compressed air to generate combustion gas, a turbine driven by the combustion gas, a fuel line connected to the combustor so that the fuel is able to be supplied to the combustor, a fuel valve provided on the fuel line and configured to adjust a fuel flow rate that is a flow rate of the fuel flowing into the fuel line, a bypass line configured to externally exhaust a part of the compressed air from the compressor without involving the combustor, and a bypass valve provided on the bypass line and configured to adjust a bleed flow that is a flow rate of the compressed air flowing through the bypass line, wherein the compressor includes a suction amount adjuster having a vane capable of being opened and closed so that the suction amount that is a flow rate of air suctioned by the compressor is able to be adjusted, the control device for the gas turbine comprising:

a fuel controller configured to determine the fuel flow rate in accordance with a target output for the gas turbine and indicate a valve opening degree to the fuel valve so that the determined fuel flow rate is reached;

a suction amount controller configured to determine opening and closing angles of the vane in accordance with the actual output of the gas turbine and issue an instruction to the suction amount adjuster so that the determined opening and closing angles of the vane are reached; and a bleed flow controller configured to determine a valve opening degree of the bypass valve in accordance with the actual output and issue an instruction to the bypass valve so that the determined valve opening degree is reached, wherein the fuel controller determines the fuel flow rate corresponding to the target output so that the fuel flow rate gradually decreases as the target output decreases and the valve opening degree is indicated to the fuel valve so that the determined fuel flow rate is reached, wherein the suction amount controller is able to perform a first suction amount control step and a second suction amount control step, wherein the bleed flow controller is able to perform a first bleed flow control step and a second bleed flow control step, wherein, when the actual output is in a first output range from a first output less than or equal to a rated output of the gas turbine to a second output that is an output less than the first output, the suction amount controller determines the opening and closing angles of the vane so that the suction amount gradually decreases as the actual output decreases and the opening and closing angles of the vane are indicated to the suction amount adjuster in the first suction amount control step, and the bleed flow controller issues an instruction to the bypass valve so that the bypass valve is closed in the first bleed flow control step, and wherein, when the actual output is in a second output range from the second output to a third output that is an output less than the second output, the suction amount controller determines the opening and closing angles of the vane so that the suction amount gradually decreases as the actual output decreases or the suction amount becomes constant even if the actual output decreases and the opening and closing angles of the vane are indicated to the suction amount adjuster in the second suction amount control step, and the bleed flow controller issues an instruction to the bypass valve so that the bleed flow gradually increases as the actual output decreases and the bypass valve is fully opened when the actual output of the gas turbine becomes the third output in the second bleed flow control step.

10. The control device for the gas turbine according to claim 9, wherein the suction amount controller is able to perform a third suction amount control step, wherein the bleed flow controller is able to perform a third bleed flow control step, and wherein, when the actual output is in a third output range from the third output to a fourth output that is an output less than the third output, the suction amount controller indicates the opening and closing angles of the vane to the suction amount adjuster so that the suction amount gradually decreases as the actual output decreases and the suction amount becomes minimum when the actual output of the gas turbine becomes the fourth output in the third suction amount control step, and the bleed flow controller issues an instruction to the bypass valve so that the bypass valve is fully opened in the third bleed flow control step.

11. The control device for the gas turbine according to claim 9, wherein the third output and third opening and closing angles, which are the opening and closing angles of the vane when the actual output is the third output, are values determined under a third output condition, and wherein the third output condition is that the bypass valve is fully opened, an exhaust gas temperature, which is a temperature of the combustion gas immediately after an exhaust process of the turbine, is an allowable maximum temperature, and the temperature of the combustion gas flowing into the turbine is a temperature when a concentration of an unburned component included in the combustion gas becomes an allowable maximum concentration.

12. The control device for the gas turbine according to claim 11, wherein the second output and second opening and closing angles, which are the opening and closing angles of the vane when the actual output is the second output, are values determined under a second output condition, and wherein the second output condition is that a trend of a change in the opening and closing angles of the vane within the second output range is a predetermined change trend based on the third opening and closing angles, the bypass valve is closed, and the exhaust gas temperature, which is the temperature of the combustion gas immediately after the exhaust process of the turbine, is an allowable maximum temperature.

13. The control device for the gas turbine according to claim 9, wherein the suction amount controller determines the opening and closing angles of the vane so that the suction amount gradually decreases as the actual output decreases in the second suction amount control step and indicates the opening and closing angles of the vane to the suction amount adjuster.

14. The control device for the gas turbine according to claim 9, wherein the suction amount controller determines the opening and closing angles of the vane so that the suction amount becomes constant even if the actual output decreases in the second suction amount control step and indicates the opening and closing angles of the vane to the suction amount adjuster.

15. The control device for the gas turbine according to claim 9,
wherein each of the suction amount controller and the bleed flow controller performs a mode when an instruction for executing one of a bleed flow control mode and a normal control mode is received,
wherein, in the bleed flow control mode,
the suction amount controller performs the first suction amount control step and the bleed flow controller performs the first bleed flow control step in the first output range, and
the suction amount controller performs the second suction amount control step and the bleed flow controller performs the second bleed flow control step in the second output range, and
wherein, in the normal control mode,
even if the output of the gas turbine is in one of the first output range and the second output range in the normal control mode,
the suction amount controller performs a normal suction amount control step of determining the opening and closing angles of the vane so that the suction amount gradually decreases as the actual output decreases and indicating the opening and closing angles of the vane to the suction amount adjuster, and
the bleed flow controller performs a normal bleed flow control step of issuing an instruction to the bypass valve so that the bypass valve is closed.

16. A gas turbine facility comprising:
the control device for the gas turbine according to claim 9; and
the gas turbine.

* * * * *